United States Patent
Chen et al.

(10) Patent No.: US 11,489,766 B2
(45) Date of Patent: Nov. 1, 2022

(54) INTERIOR GATEWAY PROTOCOL FLOOD MINIMIZATION

(71) Applicant: HUAWEI TECHNOLOGIES CO., LTD., Shenzhen (CN)

(72) Inventors: Huaimo Chen, Bolton, MA (US); Dean Cheng, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/969,911

(22) PCT Filed: Dec. 5, 2018

(86) PCT No.: PCT/CN2018/119251
§ 371 (c)(1),
(2) Date: Aug. 13, 2020

(87) PCT Pub. No.: WO2019/137118
PCT Pub. Date: Jul. 18, 2019

(65) Prior Publication Data
US 2021/0119910 A1 Apr. 22, 2021

Related U.S. Application Data

(60) Provisional application No. 62/750,677, filed on Oct. 25, 2018, provisional application No. 62/624,986, (Continued)

(51) Int. Cl.
*H04L 12/721* (2013.01)
*H04L 12/751* (2013.01)
(Continued)

(52) U.S. Cl.
CPC ............. *H04L 45/32* (2013.01); *H04L 45/02* (2013.01); *H04L 45/12* (2013.01); *H04L 45/28* (2013.01); *H04L 45/44* (2013.01); *H04L 45/48* (2013.01)

(58) Field of Classification Search
None
See application file for complete search history.

(56) References Cited

U.S. PATENT DOCUMENTS

| | | | |
|---|---|---|---|
| 5,831,975 A | 11/1998 | Chen et al. | |
| 6,757,258 B1 | 6/2004 | Pillay-Esnault | |

(Continued)

FOREIGN PATENT DOCUMENTS

| | | |
|---|---|---|
| CN | 103001879 A | 3/2013 |
| CN | 104521192 A | 4/2015 |

(Continued)

OTHER PUBLICATIONS

Previdi et al., "IS-IS Extensions for Segment Routing", draft-ietf-isis-segment-routing-extensions-15, Dec. 19, 2017 (Year: 2017).*

(Continued)

*Primary Examiner* — Yaotang Wang
(74) *Attorney, Agent, or Firm* — Conley Rose, P.C.

(57) ABSTRACT

Disclosed is a mechanism for implementing link state flooding reduction (LSFR) in an Interior Gateway Protocol (IGP) network. The mechanism includes receiving data indicating connectivity of a plurality of nodes in the network. A flooding topology is built based on the connectivity. This includes selecting one of the nodes as a root node, and building a tree of links connecting the root node to the nodes in the network. The flooding topology is stored in a memory. The flooding topology may not be to the remaining nodes in the network. Link state messages may then be flooded over the flooding topology.

21 Claims, 16 Drawing Sheets

| Info-TLV-Type 1701 | | | TLV-Length 1702 |
|---|---|---|---|
| OP 1731 | MOD 1732 | Algorithm 1733 | Reserved |
| Sub-TLVs (optional) 1706 | | | |

Related U.S. Application Data filed on Feb. 1, 2018, provisional application No. 62/616,499, filed on Jan. 12, 2018.

(51) Int. Cl.

| | | |
|---|---|---|
| *H04L 12/703* | (2013.01) | |
| *H04L 12/753* | (2013.01) | |
| *H04L 45/00* | (2022.01) | |
| *H04L 45/02* | (2022.01) | |
| *H04L 45/12* | (2022.01) | |
| *H04L 45/28* | (2022.01) | |
| *H04L 45/44* | (2022.01) | |
| *H04L 45/48* | (2022.01) | |

(56) References Cited

U.S. PATENT DOCUMENTS

| | | | |
|---|---|---|---|
| 7,792,987 | B1 | 9/2010 | Vohra et al. |
| 7,983,239 | B1 | 7/2011 | Weinstein et al. |
| 2006/0040705 | A1 | 2/2006 | Kawakami et al. |
| 2006/0133298 | A1 | 6/2006 | Ng et al. |
| 2007/0223368 | A1 | 9/2007 | Ozaki |
| 2010/0020719 | A1 | 1/2010 | Chu et al. |
| 2011/0026437 | A1* | 2/2011 | Roja-Cessa ............ H04L 45/04 370/256 |
| 2011/0090787 | A1* | 4/2011 | Smith .................... H04L 45/32 370/256 |
| 2011/0116366 | A1 | 5/2011 | Smith et al. |
| 2013/0121156 | A1* | 5/2013 | Rege .................... H04L 45/48 370/238 |
| 2014/0043956 | A1 | 2/2014 | Mirtorabi et al. |
| 2014/0269410 | A1 | 9/2014 | Shah et al. |
| 2016/0173366 | A1* | 6/2016 | Saad .................... H04L 45/20 370/218 |
| 2019/0215266 | A1* | 7/2019 | Filsfils ................ H04L 45/125 |

FOREIGN PATENT DOCUMENTS

| | | |
|---|---|---|
| CN | 105282041 A | 1/2016 |
| CN | 107249147 A | 10/2017 |
| WO | 2015117412 A1 | 8/2015 |

OTHER PUBLICATIONS

Chen et al., LS Flooding Reduction draft-cc-lsr-flooding-reduction-00, Network Working Group, pp. 26-27, Dec. 10, 2018 (Year: 2018).*

Li, T., et al., "An Architecture for Dynamic Flooding on Dense Graphs," draft-li-dynamic-flooding-00, Jan. 3, 2018, 8 pages.

Choudhury, G., et al., "Prioritized Treatment of Specific OSPF Version 2 Packets and Congestion Avoidance," RFC 1222, Oct. 2005, 15 pages.

Shen, et al, "IS-IS Routing for Spine-Leaf Topology," draft-shen-isis-spine-leaf-ext-00, Nov. 2, 2015, 12 pages.

Shen, et al., "IS-IS Routing for Spine-Leaf Topology," draft-shen-isis-spine-leaf-ext-04, Jun. 30, 2017, 17 pages.

Li., T.," Dynamic Flooding for IS-IS," draft-li-dynamic-flooding-isis-00, Jan. 7, 2018, 8 pages.

Chen, H., et al. "LS Distributed Flooding Reduction," draft-cc-lsr-flooding-reduction-03, Network Working Group Internet-Draft, Mar. 11, 2019, 28 pages.

\* cited by examiner

1400

| LS age 1401 | Options 1402 | LS type 1403 |
|---|---|---|
| Link State ID 1404 ||| 
| Advertising Router 1405 ||| 
| LS sequence number 1406 ||| 
| LS checksum 1407 || LS length 1408 |
| 0  V E B F  0<br>1421 1422 1423 1431 || # links 1409 |
| Link ID 1410 ||| 
| Link Data 1411 ||| 
| Type 1412 | # TOS 1413 | metric 1414 |
| Type 1415 | 0 | ToS metric 1416 |

1800

| Info-TLV-Type 1801 | TLV-Length 1802 |
|---|---|
| Priority 1803 | Reserved |
| Sub-TLVs (optional) 1806 | | ial
INTERIOR GATEWAY PROTOCOL FLOOD MINIMIZATION

CROSS-REFERENCE TO RELATED APPLICATIONS

This application is a National Stage filing of International Application No. PCT/CN2018/119251, filed on Dec. 5, 2018, which claims the benefit of U.S. Provisional Patent Application No. 62/616,499, filed Jan. 12, 2018 by Huaimo Chen, and titled "Open Shortest Path First (OSPF) Flood Minimization," to U.S. Provisional Patent Application No. 62/624,986, filed Feb. 1, 2018 by Huaimo Chen, and titled "Intermediate System-Intermediate System (IS-IS) Flood Minimization," to U.S. Provisional Patent Application No. 62/750,677, filed Oct. 25, 2018 by Huaimo Chen, and titled "Interior Gateway Protocol Flood Minimization," all of which are hereby incorporated by reference.

TECHNICAL FIELD

The present disclosure is generally related to Interior Gateway Protocol (IGP) based networks, and is specifically related to a mechanism to create a separate flooding topology to support minimizing packet flooding in an IGP based network.

BACKGROUND

Certain networks employ link state information to route packets. In such networks, each node broadcasts the node's link state information across the network in link state messages as part of a synchronization process. A node's link state information includes data identifying the node, indicating the node's neighbors, and indicating distance and/or routing costs to contact such neighbors. Each node receives the link state messages from the other nodes, and uses the link state information to populate a link state database. Each node can then use a corresponding link state database to determine shortest paths for communicating data packets with other nodes. Such networks suffer from certain scalability problems. Specifically, each node periodically broadcasts a link state message to all other nodes in the network. As more nodes are added to the network, more link state messages are broadcast, which results in ever increasing signaling overhead that competes with data traffic for bandwidth.

SUMMARY

In an embodiment, the disclosure includes a method implemented in a first node in a network. The method comprises receiving, at a receiver of the first node, data indicating connectivity of a plurality of nodes in the network including the first node. The method further comprises building, by a processor of the first node, a flooding topology based on the connectivity. The flooding topology is built by selecting one of the nodes as a root node, and building a tree of links connecting the root node to the nodes in the network. The flooding topology is stored in a memory without transmitting the flooding topology to the plurality of nodes in the network. The method further comprises flooding, by a transmitter of the first node, link state messages over the flooding topology. Employing a flooding topology allows list state messages to reach all nodes in the network without requiring the link state messages be flooded over all links. This reduces redundant link state message traffic, and hence reduces network traffic congestion. Such reduction also provides for increased network scalability as the flooding topology reduces network traffic congestion in a manner that is proportional to the number of network nodes. Also, allowing each node to separately calculate the flooding topology without transmitting the flooding topology over the network further reduces network traffic congestion.

Optionally, in any of the preceding aspects, another implementation of the aspect includes, further comprising receiving, at the receiver, a request specifying a number of leaf links to add to the tree, and adding to the flooding topology, by the processor, the number of leaf links between the nodes in the network. Adding leaf links to the flooding topology adds redundancy, but also stability. Additional leaf links reduce the number of potential sources of equipment failure that could sever the flooding topology.

Optionally, in any of the preceding aspects, another implementation of the aspect includes, wherein, prior to adding leaf links, the tree of links in the flooding topology contains a minimum number of links to connect all of the nodes in the network to the root node.

Optionally, in any of the preceding aspects, another implementation of the aspect includes, further comprising establishing, by the processor, an adjacency with a newly connected node. The newly connected node is directly connected to the first node via a link. The method further comprises adding, by the processor, the newly connected node to the tree of links in the flooding topology until the flooding topology is recomputed. This allows new nodes to be added to the flooding topology without requiring that the flooding topology be immediately recomputed by the entire network.

Optionally, in any of the preceding aspects, another implementation of the aspect includes, further comprising receiving, at the receiver, a first link state message across a link that is excluded from the flooding topology; and flooding, by the transmitter, the first link state message across links on the flooding topology. This allows link state messages received from outside the flooding topology to be forwarded across the network without flooding across all interfaces. This may be used to allow for backwards compatibility with devices that are not capable of employing a flooding topology.

Optionally, in any of the preceding aspects, another implementation of the aspect includes, further comprising: receiving, at the receiver, a second link state message indicating a second node in the network is down; and flooding, by the transmitter, the second link state message to links that connect between the first node and neighbors of the second node. This allows for communication around a malfunctioning node while maintaining the flooding topology for portions of the network that are not directly connected to the malfunction.

Optionally, in any of the preceding aspects, another implementation of the aspect includes, further comprising receiving, at the receiver, a third link state message indicating a first link in the network is down. The method further comprises determining that the first link is a critical element. The method further comprises based on the determination, sending the third link state message to links that connect to neighbors which also connect nodes adjacent to a node attached to the first link. This allows for communication around a malfunctioning link while maintaining the flooding topology for portions of the network that are not directly connected to the malfunction.

Optionally, in any of the preceding aspects, another implementation of the aspect includes, further comprising:

determining, by the processor, critical elements, wherein a critical element is a link or node whose failure splits the flooding topology; and discontinuing use of the flooding topology when a critical interface fails. Failure of a critical element breaks the flooding topology into multiple topologies. Hence, failure of a critical element may prevent link state messages over the flooding topology from reaching all nodes in the network. Maintaining awareness of this potential problem allows the network to revert to general flooding until another flooding topology can be generated that omits the critical interface.

Optionally, in any of the preceding aspects, another implementation of the aspect includes, wherein the link state messages are Open Shortest Path First (OSPF) Link State Advertisements (LSAs).

Optionally, in any of the preceding aspects, another implementation of the aspect includes, wherein the link state messages are Intermediate System to Intermediate System (IS-IS) Link State Protocol data units (LSPs).

Optionally, in any of the preceding aspects, another implementation of the aspect includes, wherein the link state messages contain Flooding reduction (F) flags set to indicate the nodes in the network that support link state flooding reduction via the flooding topology. The F flags allows for backwards compatibility.

Optionally, in any of the preceding aspects, another implementation of the aspect includes, wherein the link state messages contain a mode field set to indicate centralized link state flooding reduction, distributed link state flooding reduction, or statically configured link state flooding reduction.

Optionally, in any of the preceding aspects, another implementation of the aspect includes, wherein the link state messages contain an algorithm field set to indicate an algorithm to build the tree of links in the flooding topology.

Optionally, in any of the preceding aspects, another implementation of the aspect includes, wherein the link state messages contain an operation (OP) field set to switch to link state flooding reduction from full network flooding.

In an embodiment, the disclosure includes a first node in a network. The first node comprises a receiver configured to receive data indicating connectivity of a plurality of nodes in the network including the first node. The first node also comprises a processor coupled to the receiver. The processor is configured to build a flooding topology based on the connectivity. This occurs by selecting one of the nodes as a root node, and building a tree of links connecting the root node to the nodes in the network. The first node also comprises a memory coupled to the processor, the memory configured to store the flooding topology. The first node also comprises a transmitter coupled to the processor, the transmitter configured to flood link state messages over the flooding topology without transmitting the flooding topology to the remaining nodes in the network. Employing a flooding topology allows list state messages to reach all nodes in the network without requiring the link state messages be flooded over all links. This reduces redundant link state message traffic, and hence reduces network traffic congestion. Such reduction also provides for increased network scalability as the flooding topology reduces network traffic congestion in a manner that is proportional to the number of network nodes. Also, allowing each node to separately calculate the flooding topology without transmitting the flooding topology over the network further reduces network traffic congestion.

Optionally, in any of the preceding aspects, another implementation of the aspect includes, wherein the receiver is further configured to receive a request specifying a number of leaf links to add to the tree, and wherein the processor is further configured to add to the flooding topology the number of leaf links between the nodes in the network. Adding leaf links to the flooding topology adds redundancy, but also stability. Additional leaf links reduce the number of potential sources of equipment failure that could sever the flooding topology.

Optionally, in any of the preceding aspects, another implementation of the aspect includes, wherein, prior to adding leaf links, the tree of links in the flooding topology contains a minimum number of links to connect all of the nodes in the network to the root node.

Optionally, in any of the preceding aspects, another implementation of the aspect includes, wherein the processor is further configured to establish an adjacency with a newly connected node, wherein the newly connected node is directly connected to the first node via a link, and wherein the processor is further configured to add the newly connected node to the tree of links in the flooding topology until the flooding topology is recomputed. This allows new nodes to be added to the flooding topology without requiring that the flooding topology be immediately recomputed by the entire network.

Optionally, in any of the preceding aspects, another implementation of the aspect includes, wherein the receiver is further configured to receive a first link state message across a link that is excluded from the flooding topology, and wherein the transmitter is further configured to flood the first link state message across links on the flooding topology. This allows link state messages received from outside the flooding topology to be forwarded across the network without flooding across all interfaces. This may be used to allow for backwards compatibility with devices that are not capable of employing a flooding topology.

Optionally, in any of the preceding aspects, another implementation of the aspect includes, wherein the receiver is further configured to receive a second link state message indicating a second node in the network is down, and wherein the transmitter is further configured to flood the second link state message to links that connect between the first node and neighbors of the second node. This allows for communication around a malfunctioning node while maintaining the flooding topology for portions of the network that are not directly connected to the malfunction.

Optionally, in any of the preceding aspects, another implementation of the aspect includes, wherein the receiver is further configured to receive a third link state message indicating a first link in the network is down, wherein the processor is further configured to determine that the first link is a critical element, and wherein the transmitter is further configured to, based on the determination, send the third link state message to links that connect to neighbors which also connect to nodes adjacent to a node attached to the first link. This allows for communication around a malfunctioning link while maintaining the flooding topology for portions of the network that are not directly connected to the malfunction.

Optionally, in any of the preceding aspects, another implementation of the aspect includes, wherein the processor is further configured to determine critical elements, wherein a critical element is a link or node whose failure splits the flooding topology; and discontinue use of the flooding topology when a critical element fails. Failure of a critical element breaks the flooding topology into multiple topologies. Hence, failure of a critical element may prevent link state messages over the flooding topology from reaching all nodes in the network. Maintaining awareness of this potential problem allows the network to revert to general flooding until another flooding topology can be generated that omits the critical interface.

Optionally, in any of the preceding aspects, another implementation of the aspect includes, wherein the link state messages are Open Shortest Path First (OSPF) Link State Advertisements (LSAs).

Optionally, in any of the preceding aspects, another implementation of the aspect includes, wherein the link state messages are Intermediate System to Intermediate System (IS-IS) Link State Protocol data units (LSPs).

Optionally, in any of the preceding aspects, another implementation of the aspect includes, wherein the link state messages contain Flooding reduction (F) flags set to indicate the nodes in the network that support link state flooding reduction via the flooding topology. The F flags allows for backwards compatibility.

Optionally, in any of the preceding aspects, another implementation of the aspect includes, wherein the link state messages contain a mode field set to indicate centralized link state flooding reduction, distributed link state flooding reduction, or statically configured link state flooding reduction.

Optionally, in any of the preceding aspects, another implementation of the aspect includes, wherein the link state messages contain an algorithm field set to indicate an algorithm to build the tree of links in the flooding topology.

Optionally, in any of the preceding aspects, another implementation of the aspect includes, wherein the link state messages contain an operation (OP) field set to switch to link state flooding reduction from full network flooding.

In an embodiment, the disclosure includes a non-transitory computer readable medium comprising a computer program product for use by a first node in a network, the computer program product comprising computer executable instructions stored on the non-transitory computer readable medium such that when executed by a processor cause the first node to perform any of the preceding aspects.

In an embodiment, the disclosure includes a first node in a network. The first node comprises a receiving means for receiving data indicating connectivity of a plurality of nodes in the network including the first node. The first node also comprises a processing means for build a flooding topology based on the connectivity. This occurs by selecting one of the nodes as a root node, and building a tree of links connecting the root node to the nodes in the network. The first node also comprises a memory storage means for storing the flooding topology. The first node also comprises a transmitting means for flooding link state messages over the flooding topology without transmitting the flooding topology to the remaining nodes in the network.

Optionally, in any of the preceding aspects, another implementation of the aspect includes, wherein the receiving means, processing means, memory storage means, and transmitting means are configured to perform any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 14 is a schematic diagram of an example Open Shortest Path First (OSPF) version two (v2) encoding for indicating node support for LSFR.

FIG. 16 is a schematic diagram of an example Intermediate System-Intermediate System (IS-IS) encoding for indicating node support for LSFR.

FIG. 17 is a schematic diagram of an example LSFR control type length value (TLV) encoding for managing LSFR in an IGP network.

DETAILED DESCRIPTION

Figure 1:
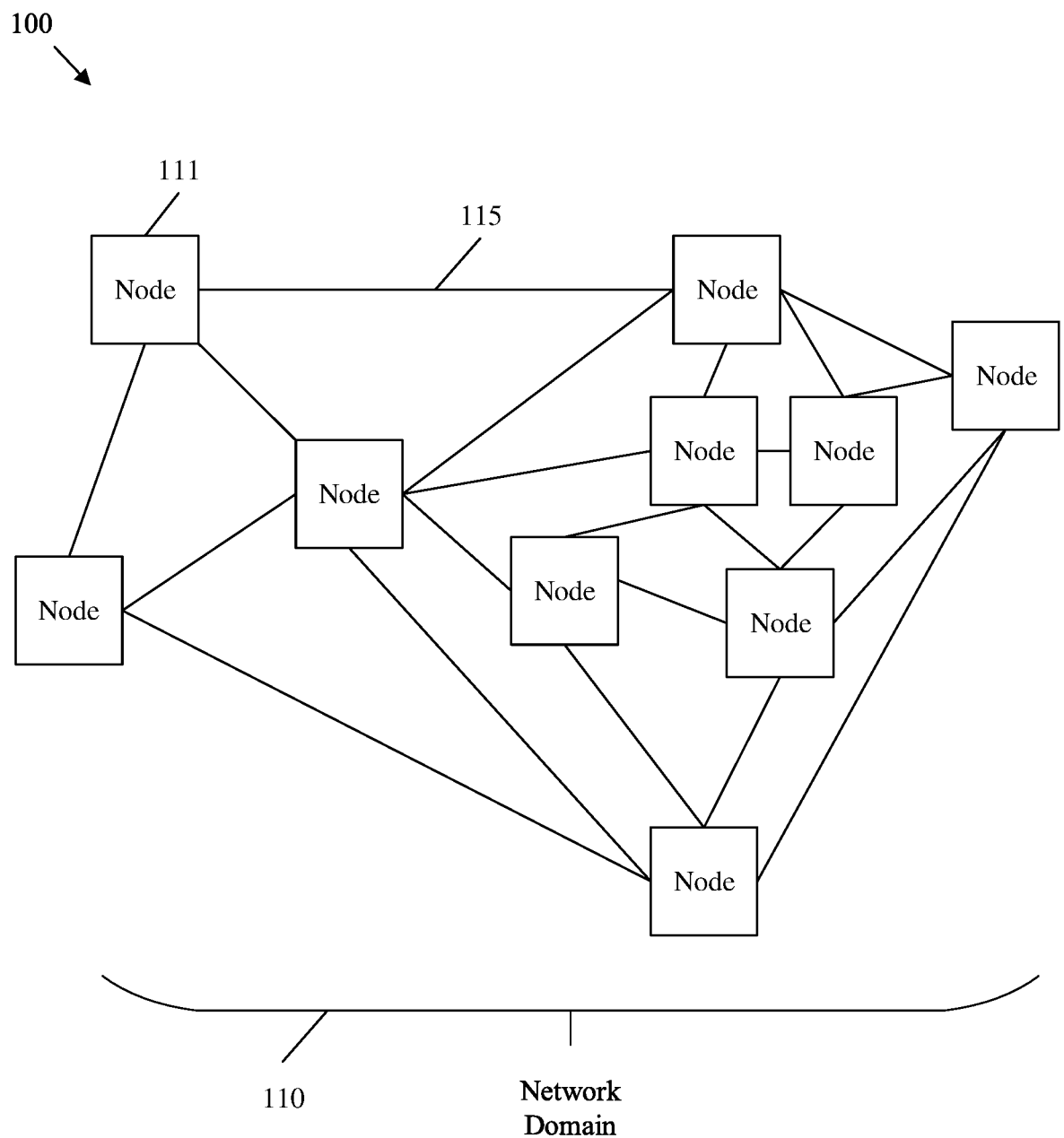
FIG. 1 is a schematic diagram of an example IGP network.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various mechanisms to reduce signaling overhead related to link state messages in IGP networks, such as OSPF and/or IS-IS networks. Communicating link state messages from a node to all other nodes in a network domain is referred to as flooding. The disclosed mechanisms, referred to collectively as LSFR, reduce the impact of link state message flooding by generating a flooding topology that is a subset of the real network topology. In general, each node floods the network by transmitting link state messages over the flooding topology without transmitting such messages across network links that are excluded from the flooding topology. This allows the message to reach all other nodes in the network, while minimizing the number of redundant copies of the message received at each node. For example, the flooding topology may be generated as a tree of links (e.g., a spanning tree) that connects the nodes. Such a tree of links allows a link state message to be flooded to all nodes while ensuring each node receives a single copy of the flooded message. For increased reliability, leaves may be added to the tree of links as directed by a network administrator. This adds back some message redundancy, but increases network reliability by providing alternate message path(s) across the flooding topology in the event a link or node malfunctions. In distributed mode, each node determines the flooding tree by employing a common algorithm, which may be selected by the administrator. This allows each node to maintain a copy of the flooding topology without flooding a copy of the flooding topology over the network, which would increase network congestion. A Flooding reduction (F) flag is also disclosed. The F flag allows each node to communicate LSFR support, and hence allows nodes to employ the flooding topology while maintaining backwards compatibility with nodes that do not support LSFR. The F flag also allows non-LSFR nodes to be connected farther away from the root of the flooding topology tree. Also disclosed are mechanisms to manage link state message flooding in the event of network changes. For example, when a new node enters the network and communicates with a neighbor node already on the flooding topology, the neighbor node may add the new node to the flooding topology until a recalculation of the flooding topology occurs, and a new flooding topology is built. Further, when a link or node malfunctions, a node adjacent to the malfunction can communicate link state messages to other nodes that are adjacent to the malfunction via links that are excluded from the flooding topology to ensure such nodes continue to receive link state messages until the malfunction is addressed. In addition, the nodes may each retain knowledge of critical elements. A critical element is a flooding topology link/interface or node that, upon failure, splits the flooding topology into two or more disjoint parts. Upon notification of the failure of a critical element, the nodes may revert to flooding link state messages over all links in order to maintain network functionality until the link/node is repaired or until a new flooding topology can be computed that does not include the failed element. When a critical element is a flooding topology link (or interface), the critical element is called a critical interface or a critical link. When a critical element is a flooding topology node, the critical element is called a critical node.

FIG. 1 is a schematic diagram of an example IGP network 100. An IGP network 100 is a network configured to exchange routing and/or switching information based on an IGP protocol, such as OSPF and/or IS-IS. The IGP network 100 includes a plurality of nodes 111 interconnected by links 115. A node 111 is a network device capable of receiving a data packet from a source on a first interface, determining a destination of the data packet can be reached via a second interface, and forwarding the data packet toward the destination via the second interface. For clarity of discussion, the term data packet as used herein includes both data packets and data frames. A link 115 is a medium capable of propagating a signal from an interface of a first node 111 to an interface of a second node 111.

The nodes 111 are interconnected to form a network domain 110. As used herein, a network domain 110 is a group of interconnected nodes 111 that share network addressing schemes, policies, and/or protocols. Specifically, the nodes 111 of network domain 110 employ a link state routing protocol. When employing a link state routing protocol, each node 111 in the network domain 110 maintains a complete network topology (e.g., a routing table) and independently determines next hops for data packets by employing locally stored information related to the network topology. The network topology includes data indicating the structure of the IGP network 100, such as node 111 and link 115 connections, node 111 adjacencies, node 111 interface information, and/or other link 115/node 111 relationship information.

The nodes 111 share link state information across the network domain 110. Link state information for a node 111 includes data identifying the node 111 (e.g., the node's 111 address), a list of the node's 111 neighbors, and costs/delays between the node 111 and the node's 111 neighbors. Nodes 111 are neighbors when separated by a single link 115. In order to share link state information, the node's 111 flood link state messages across the network domain 110. In OSPF, the link state messages are known as link state advertisements (LSAs). In IS-IS, the link state messages are known as link state protocol data units (LSPs). In some examples, each node 111 floods link state messages on all interfaces. As used herein, flooding indicates simultaneous transmission of a packet/frame on a predefined set of network interfaces. Such an approach may create problems as the size of the IGP network 100 increases. For example, when each node 111 periodically sends a link state message to all other nodes 111 via all interfaces, network traffic related to link state data may increase drastically as more nodes 111 are added to the IGP network 100. Further, each node 111 may receive a link state message for each other node 111 on all interfaces. This may result in each node 111 receiving multiple redundant link state messages.

The present disclosure modifies the protocols employed by the nodes 111 in the network domain 110 in order to reduce redundant link state messages. The process of reducing redundant link state message communication is referred to herein as list state flood reduction (LSFR). Specifically, the nodes 111 are modified to generate and maintain a flooding topology that is a subset of the IGP network 100 topology. Link state messages are flooded over the flooding topology instead of over the entire IGP network 100 topology. This approach reduces the communication of redundant link state messages, which increases the scalability of the IGP network 100. Further, reducing link state message traffic reduces overall network maintenance signaling, and hence increases the communication capacity of the nodes 111 for data traffic.

Figure 2:
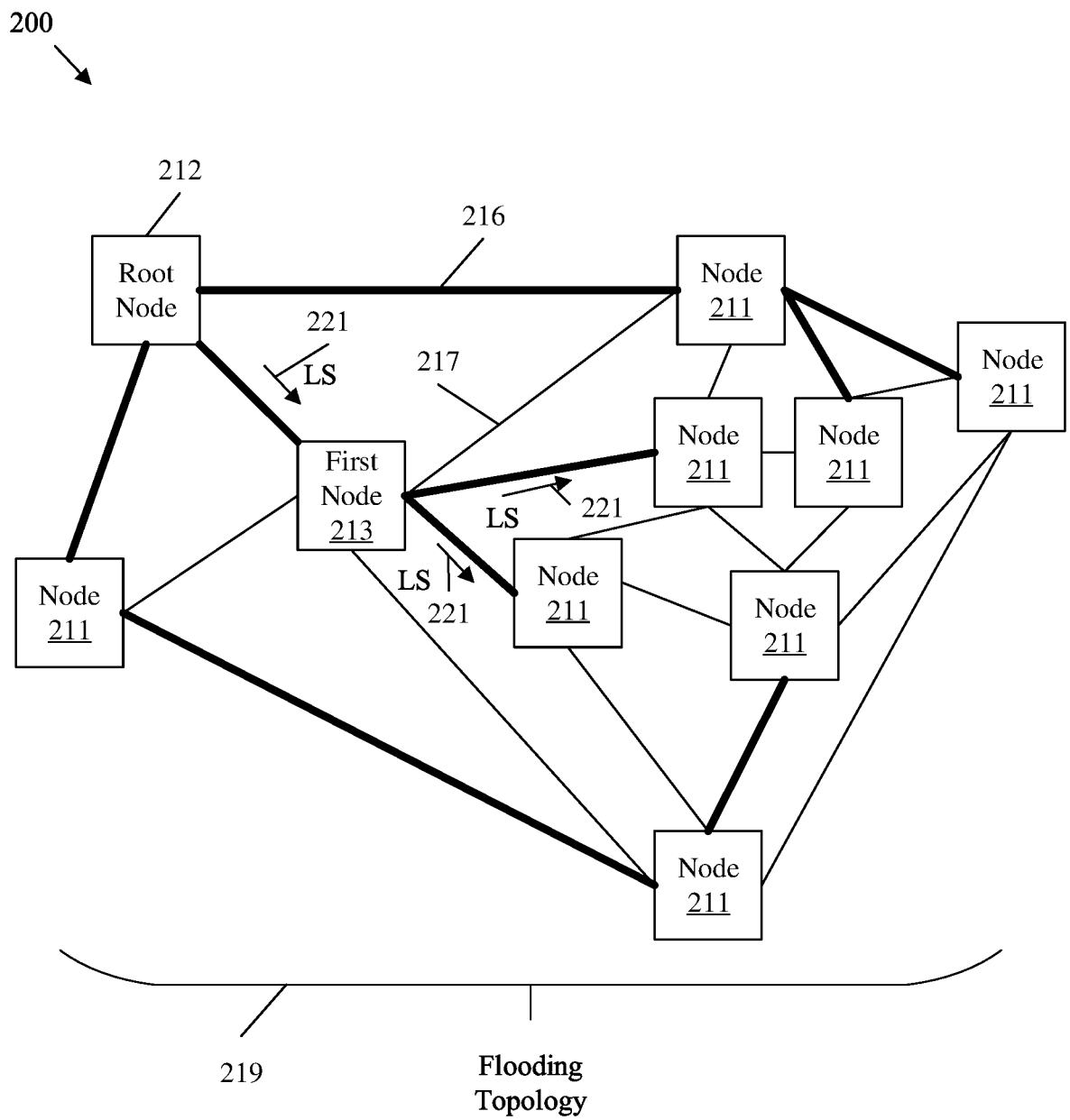
FIG. 2 is a schematic diagram of an example IGP network with a flooding topology to support distributed link state flooding reduction (LSFR).

FIG. 2 is a schematic diagram of an example IGP network 200 with a flooding topology 219 to support distributed LSFR. For example, IGP network 200 may be employed to implement LSFR on an IGP network 100. The IGP network 200 includes nodes 211, a root node 212, and a first node 213, which may be substantially similar to nodes 111 in IGP network 100. A root node 212 is a node 211 selected as a root for a spanning tree employed as a flooding topology 219. A first node 213 is a node 211, and is differentiated in order to support clarity of discussion when describing the LSFR scheme discussed herein. The IGP network 200 includes flooding topology links 216 and links 217, which are substantially similar to links 115. The flooding topology links 216, depicted in bold, are links included in the flooding topology 219, and are hence employed to transmit link state messages. The links 217, depicted without bold, are not included in the flooding topology 219, and only conduct link state messages in certain particular cases as discussed with respect to the FIGS below.

IGP network 200 may operate in a distributed mode. In distributed mode, each node 211, 212, and 213 generates a flooding topology 219 after a change in the network is detected. The flooding topology 219 is a tree of flooding topology links 216 employed to transmit link state messages. The nodes 211, 212, and 213 employ the same algorithm for generating the flooding topology 219. Accordingly, each node 211, 212, and 213 stores the flooding topology 219 in local memory without transmitting the flooding data indicating the flooding topology 219 to the remaining nodes in the IGP network 200. In this fashion, data indicating the flooding topology 219 is not sent to all nodes 211. The flooding topology 219 can be generated according to several algorithms as discussed with respect to the FIGS. below.

Each node 211, 212, and 213 can generate a flooding topology 219 after receiving data indicating the connectivity of the nodes 212, 211, and/or 213 in the IGP network 200 at each node 211, 212, and 213. Receiving/sending data may occur over a pre-existing flooding topology 219 and/or via general flooding if no pre-existing flooding topology 219 exists. Each node 211, 212, and 213 can build a copy of the flooding topology 219 by employing a selected algorithm. For example, one of the nodes of the IGP network 200 is selected as a root node 212. A root node 212 can be selected from the nodes 211/213 by many mechanisms. For example, the root node 212 may be selected from the nodes 211/213 as the node with the largest or smallest identifier (ID), internet protocol (IP) address, media access control (MAC) address, etc. Once the root node 212 is selected, a tree of flooding topology links 216 is built so that the tree of flooding topology links 216 connect the root node 212 to the nodes in the network. For example, the flooding topology 219 may be built as a spanning tree and/or a minimum weight spanning tree. A spanning tree is a subset of a graph, where all vertices (nodes 211, 212, and 213) are connected via a minimum number of edges (links 216). A minimum weight spanning tree is a subset of a graph, where all vertices (nodes 211, 212, and 213) are connected via minimum edge weight (e.g., link cost in term of latency). A flooding topology 219 tree with a root node 212 may be computed in O(N), where O(N) is big O notation indicating a linear computation time based on input (e.g., number of nodes).

A flooding topology 219 is a sub-network topology of the IGP network 200 topology that meets several criteria. First, the flooding topology 219 provides equivalent reachability to all the nodes in the sub-network as in the real network (e.g., IGP network 200). Second, when n (n>0) links 216 fail, reachability to all the nodes (e.g., nodes 211, 212, and 213) in the sub-network should be the same as in the real network. Third, when m (m>0) nodes fail, reachability to all the live nodes in the sub-network should be the same as in the real network. Fourth, the number of flooding topology links 216 in the flooding topology 219 should be minimized in order to reduce list state flooding.

Once the flooding topology 219 is generated, the nodes 211, 212, and 213 can flood link state messages, such as OSPF LSAs and/or IS-IS LSPs, over the flooding topology 219. The flooding topology 219 is designed to interact with the IGP network 200 by employing several criteria when flooding link state messages. For example, the link state messages use both the flooding topology 219 and the real IGP network 200 topology. Further, the flooding topology 219 and associated flooding mechanisms should support flooding link state messages (e.g., link state message 221) to every node 211, 212, and/or 213 in the IGP network 200 in many cases, which are discussed in greater detail with respect to the FIGS below. For example, the flooding mechanisms should allow link state messages to reach all nodes node 211, 212, and/or 213 when n (n>1) nodes are down (e.g., node failure). As another example, the flooding mechanisms should allow link state messages to reach all nodes 211, 212, and/or 213 when m (m>1) links are down (e.g., link/interface failure). The flooding mechanisms should meet such criteria while reducing (e.g., almost minimizing) link state message flooding. Also, the flooding mechanisms should be backward compatible to operate with a flooding topology 219 comprising nodes 211, 212, and/or 213 that support LSFR and nodes that are not capable of LSFR. Compatibility is discussed in more detail with respect to the FIGS below. Generally, incapable nodes are positioned on the flooding topology 219, but far away from the root node 212. The incapable nodes can then receive link state messages from the flooding topology 219 and flood them over all interfaces.

For purposes of illustration, a link state message flooding mechanism over the flooding topology 219 is discussed from the perspective of the first node 213. As used herein, the term first node 213 denotes an arbitrarily selected node 211 from the IGP network 200 for clarity of discussion. A first node 213 can receive a link state message 221, for example from the root node 212 over one or more links 216. The link state message 221 may be an LSA, an LSP, or other packet/frame carrying link state information. The link state message 221 may contain connectivity data, such as source node 211/212 ID, node 211/212 adjacency, link 216/217 IDs, interface information (e.g., port data), and/or link/node status information, such as link 216/217 cost (e.g., latency).

The first node 213 receives the link state message 221 over a flooding topology link 216. The first node 213 parses and stores data from the link state message 221 when such information is newer than locally stored data. The first node 213 then forwards the link state message 221 over the flooding topology links 216 of the flooding topology 219 toward neighbor nodes 211. The link state message 221 is not flooded back across the interface from which the link state message 221 was received (e.g., back toward the root node 212). As shown, the link state message 221 is generally not flooded across links 217 that are outside of the flooding topology 219 absent particular cases as discussed in more detail with respect to the FIGS below. Hence, the link state flooding is accomplished according to the flooding topology 219. As the flooding topology 219 connects all nodes 211, 212, and 213, each node in the IGP network 200 receives a copy of the link state message 221 and updates local link state information (e.g., in a routing table). However, because the link state message 221 is generally not flooded across links 217, the nodes 211, 212, and 213 generally do not receive redundant copies of the link state message 221. As such, link state message 221 flooding is reduced such that each node 211, 212, and 213 receives a single copy of the link state message 221 instead of a copy on each interface.

Generally limiting link state message 221 flooding to the flooding topology 219 results in several advantages. For example, the flooding mechanisms discussed herein reduce overall network traffic, and hence enhance network performance. Further, the flooding mechanisms discussed herein improve network convergence, as the flooding topology 219 is calculated at each node in distributed mode. Also, the flooding mechanisms discussed herein may reduce configuration requirements when compared to other link state flooding mechanisms.

It should be noted that some redundancy may be designed into the IGP network 200 to protect against equipment failure. Specifically, extra links 216 may be added to the flooding topology 219 in order to mitigate potential IGP network 200 communication problems. In such a case, some nodes 211, 212, 213 may receive more than one link state message 221. Accordingly, LSFR may be balanced with more reliability based on redundant link state messages. A mechanism for increasing flooding topology 219 reliability is discussed below.

Figure 3:
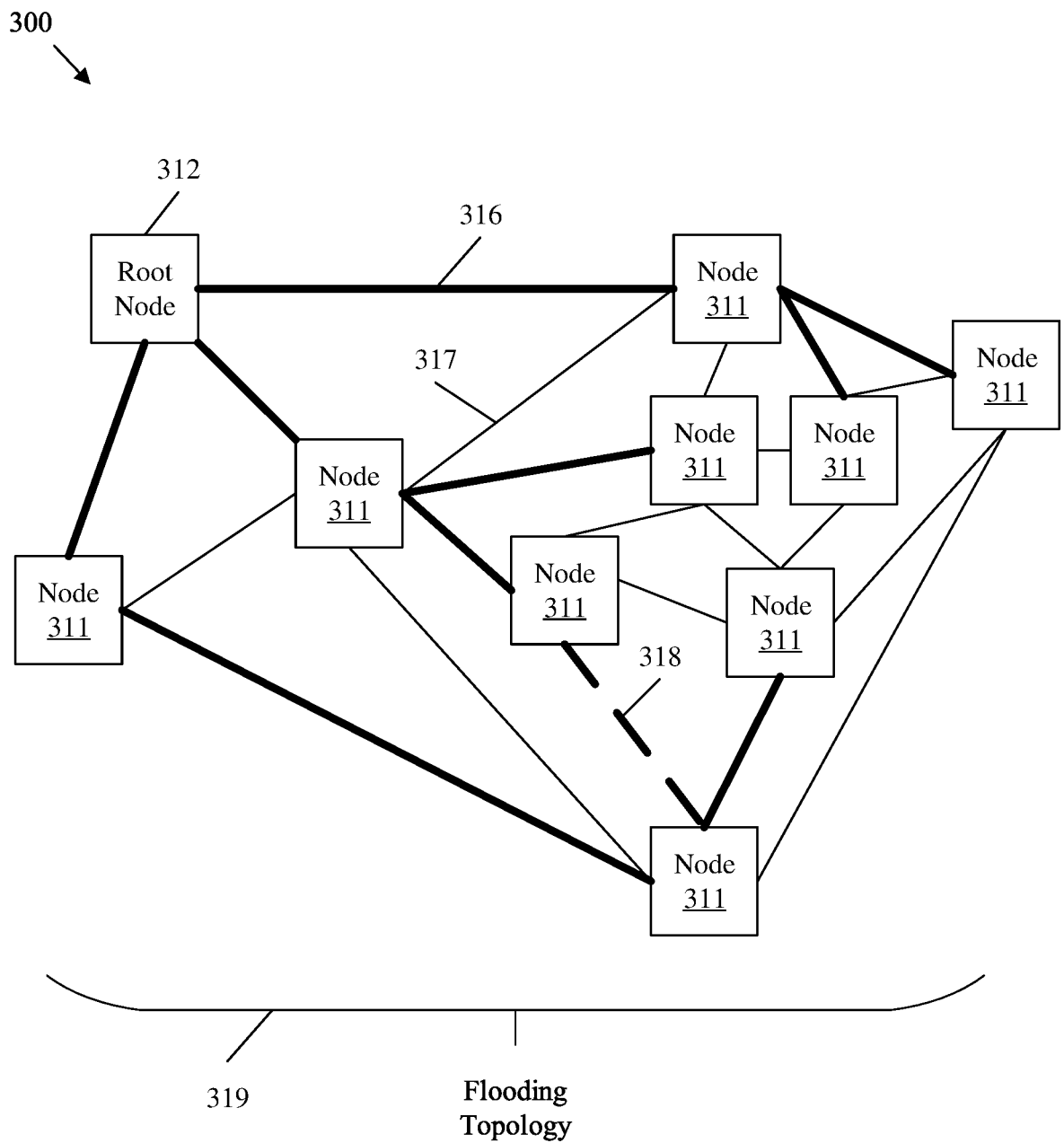
FIG. 3 is a schematic diagram of an example IGP network with a flooding topology employing a leaf.

FIG. 3 is a schematic diagram of an example IGP network 300 with a flooding topology 319 employing a leaf link 318, which may be employed to increase network reliability. The IGP network 300 is substantially similar to IGP network 200, but contains an extra leaf link 318 in the flooding topology 319. As such, the IGP network 300 contains a root node 312, nodes 311, links 317, and a flooding topology 319 containing flooding topology links 316, which are substantially similar to root node 212, nodes 211/213, links 217, flooding topology 219, and flooding topology links 216, respectively.

A leaf link 318 is a link added to the flooding topology 319 to support IGP network 300 reliability. The leaf link 318 is shown as a dashed bold line. With leaf link 318 added to the flooding topology 319 (e.g., creating a circle), some of the links 316/317 to nodes 311/312 could malfunction without causing other nodes 311/312 to be separated from the tree of flooding topology links 316. However, adding leaf link 318 may cause one of the leaf link's 318 end point node's 311/312 to receive a redundant link state message. As such, the reliability of the IGP network 300 is increased at the cost of slightly increased signal overhead.

Adding a leaf link 318 may occur during the process of building the flooding topology 319. For example, a system administrator can select a number of leaf links 318 to add to the flooding topology 319. Such a selection can be transmitted to all the nodes 311/312 in the IGP network 300. Accordingly, each node 311/312 receives the request, which specifies the number of leaf links 318 to add to the tree of flooding topology links 316 in the flooding topology 319. Each node 311/312 can build the flooding topology 319 based on the connectivity information as discussed above. Prior to adding the leaf links 318, the tree of links 316 in the flooding topology 319 may contain a minimum number of links to connect all of the nodes 311 in the IGP network 300 to the root node 312. After generating the flooding topology 319, the nodes 311/312 add to the flooding topology 319 a number of leaf links 318 k (k>=0) as specified in the request from the system administrator. The leaf link(s) 318 are added between the nodes 311/312 in the IGP network 300 to increase reliability. Leaf links 318 can be placed based on several mechanisms. For example, any flooding topology link 316 or node 311/312 that would split the flooding topology 319 into multiple trees/parts upon failure can be designated as a critical element. The leaf links 318 may be placed in positions selected in order to minimize the number of critical elements in the IGP network 300. Additional leaf link 318 placement mechanisms are discussed below.

Figure 5:
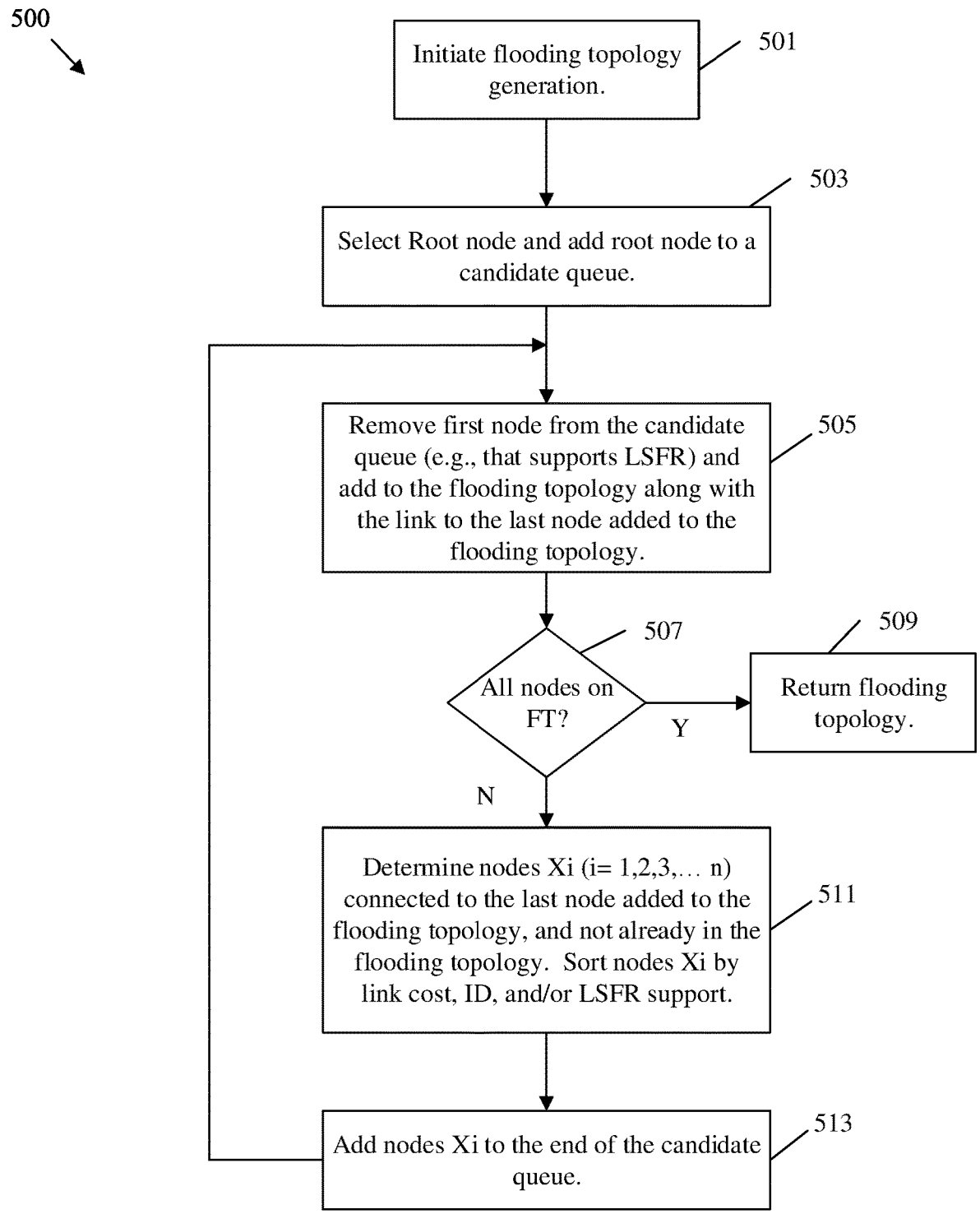
FIG. 5 is a flowchart of an example method of building a flooding topology.
Figure 6:
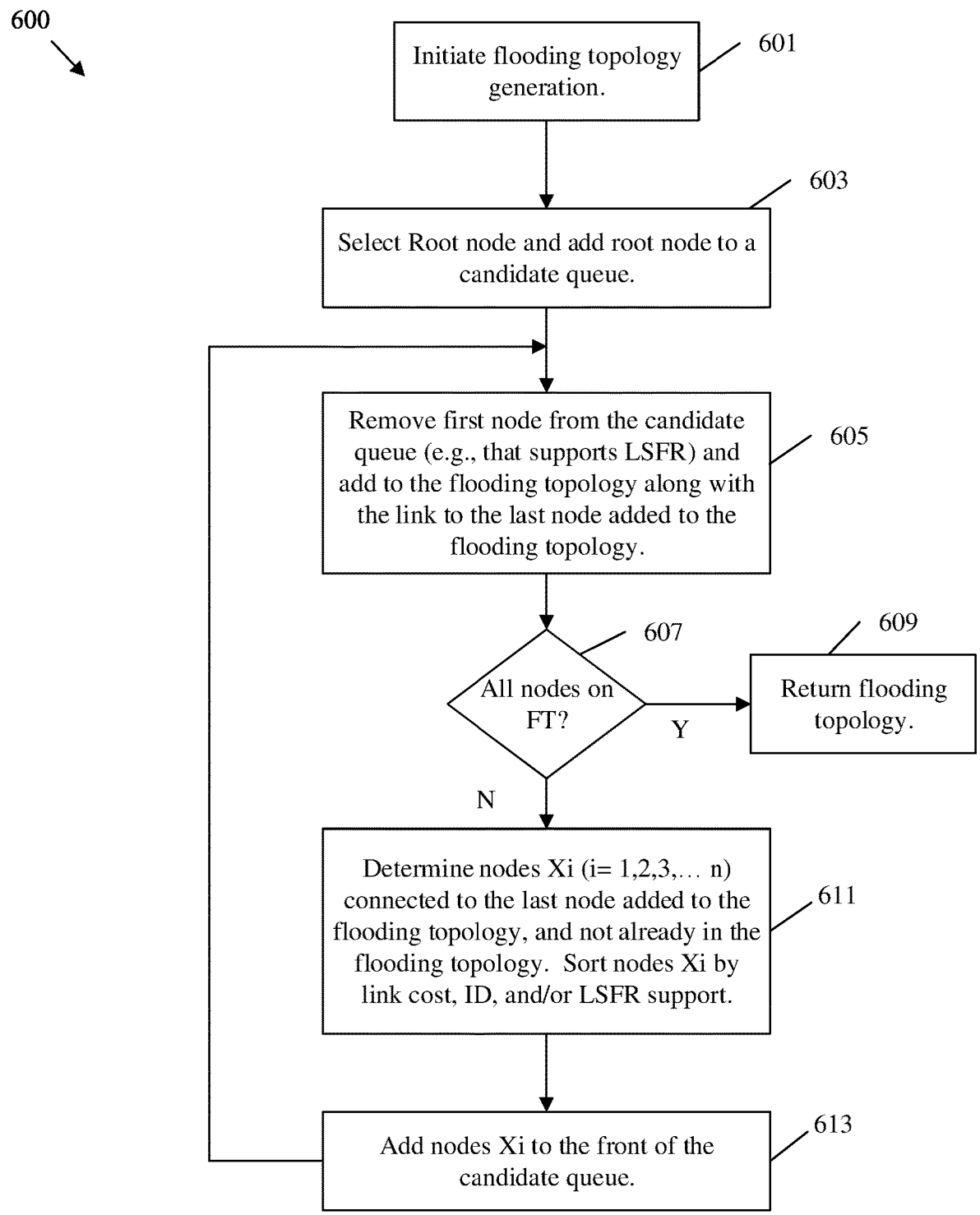
FIG. 6 is a flowchart of another example method of building a flooding topology.
Figure 7:
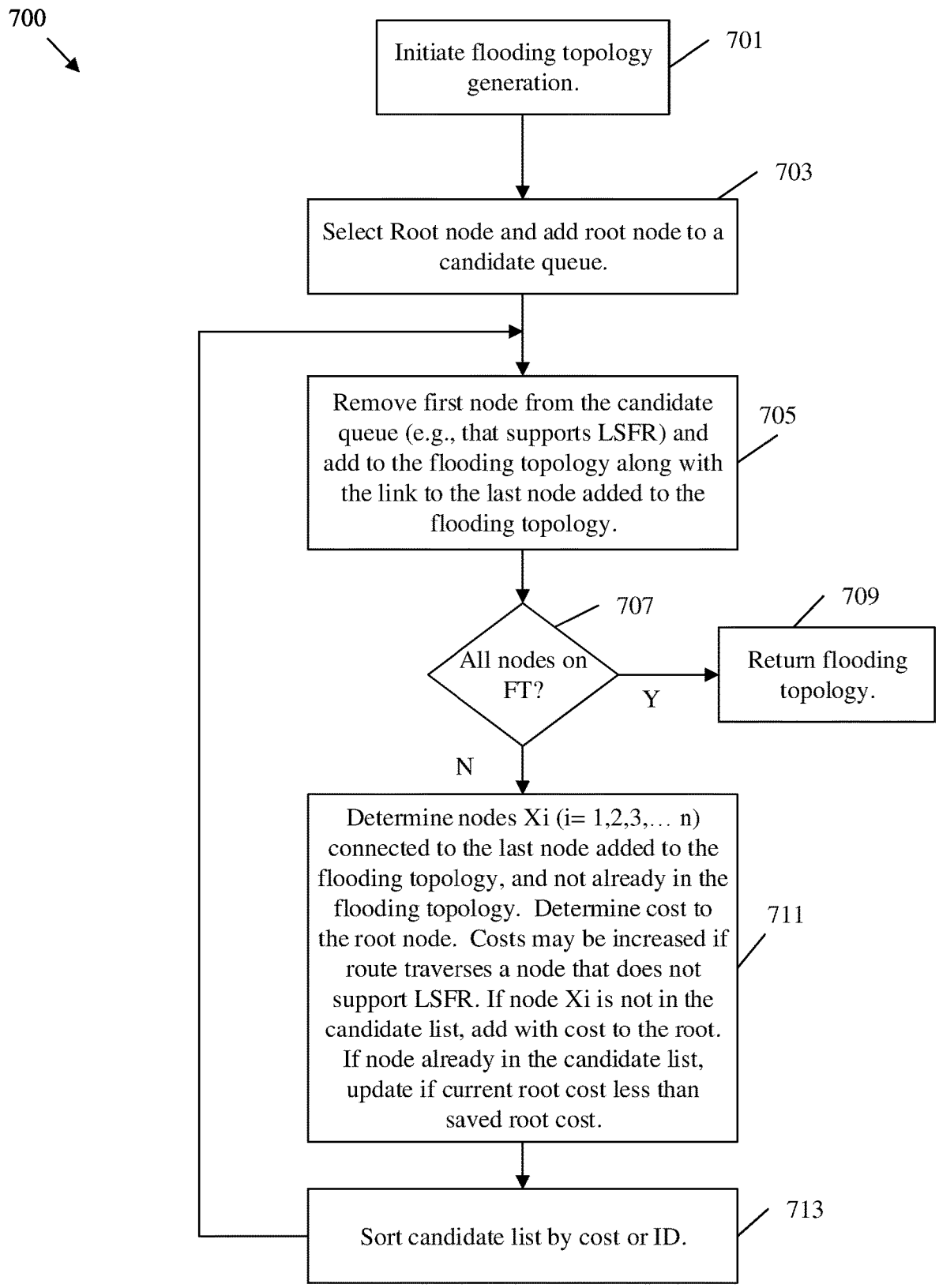
FIG. 7 is a flowchart of another example method of building a flooding topology.

For example, flooding topology 319, designated Ft, may be built by one of the mechanisms described with respect to FIGS. 5-7. In such a case, the flooding topology 319 may take the shape of a tree. An integer number of leaf links 318 k (k>=0) can then be added to the tree to create an enhanced flooding topology 319 with increased connectivity. For example, there may be m (m>0) links 317 directly connected to a node X on the flooding topology 319. A number k of leaf links 318 can be selected, where k<=m, for example by using a deterministic algorithm or rule. One algorithm or rule may include selecting k leaf links 318 that have the smallest or largest IDs of the links 317 not currently connected to the flooding topology 319. (e.g., the IDs of these k link's non-leaf ends are smaller/bigger than the IDs of the other links directly connected to the node X). Every node may have a unique ID. Hence, selecting k leaf links with smaller or larger IDs of these links' non-leaf ends is deterministic. As a specific example, if k=1 under this algorithm, the leaf link 318 selected has the smallest/largest ID among the IDs of all the links' non-leaf ends directly connected to node X.

In another example mechanism, a first node L may be directly connected to a second node N in the flooding topology 319 Ft. A connection/adjacency to a third node can be selected from the first node L as a leaf link 318 in Ft by using a deterministic algorithm or rule. For example, a first node L may be directly connected to third nodes Ni (i=1, 2, . . . , s) in the flooding topology 319 Ft via adjacencies. Further, the third nodes Ni are not the second node N, IDi is the ID of third nodes Ni, and Hi (i=1, 2, . . . , s) is the number of hops from the first node L to the third nodes Ni in the flooding topology 319 Ft. One algorithm or rule is to select the connection to third node Nj (1<=j<=s) as a leaf link 318 such that Hj is the largest among H1, H2, . . . , Hs. If there is another third node Na (1<=a<=s) and Hj=Ha, then select the third node with the smaller (or larger) node ID. Specifically, if Hj is equal to Ha and IDj<IDa, then select the connection to the third node Nj by selecting the link with smaller ID (or if Hj==Ha and IDj<IDa then select the connection to Na for selecting the one with larger node ID).

For purposes of illustration, the number of connections in total between nodes L selected and the nodes in the flooding topology 319 Ft to be added as leaf links 318 can be denoted as NLc. The number of leaf links 318 NLc can be limited programmatically. In one example, NLc is configured to a specified number such as ten, which indicates that at most ten connections between a leaf node L and nodes in the flooding topology 319 Ft can be selected and added to the flooding topology 319 Ft to generate an enhanced flooding topology 319 Ft. In another example, NLc is configured to a specified percentage of the number of nodes 311/312 in the network (e.g., five percent), which indicates that the number of connections between the leaf nodes and nodes in Ft to be selected and added into Ft is at most five percent of the number of nodes 311/312 in the IGP network 300. For example, for a network with one thousand nodes 311/31, five percent of one thousand is fifty. Thus at most fifty leaf links 318 between leaf nodes L and nodes in the flooding topology 319 Ft are selected and added into the flooding topology 319 Ft.

Figure 4:
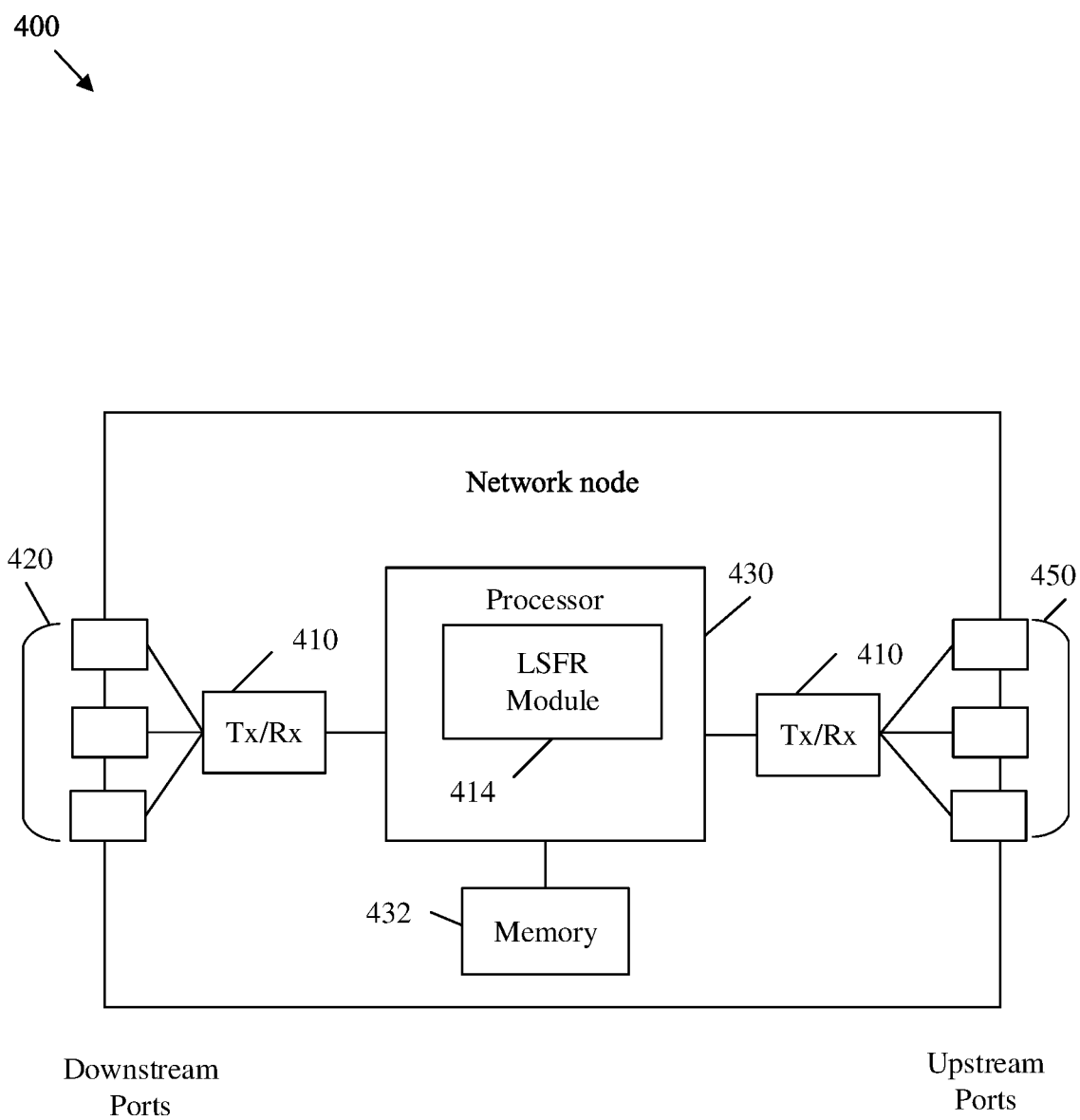
FIG. 4 is a schematic diagram of an example network node for operation in an IGP network.

FIG. 4 is a schematic diagram of an example network node 400 for operation in an IGP network, such as a node in IGP network 100, 200, and/or 300. For example, network node 400 can be employed to implement nodes 111, 211, 212, 213, 311, and/or 312. Further, network node 400 may be employed to compute a network topology 219 and/or 319.

Network node 400 may also receive, process, and forward link state messages, such as LSAs or LSPs (e.g., link state messages 221), over such flooding topologies to implement LSFR. Hence, the network node 400 is suitable for implementing the disclosed examples/embodiments as described herein. The network node 400 comprises downstream ports 420, upstream ports 450, and/or transceiver units (Tx/Rx) 410, including transmitters and/or receivers for communicating data upstream and/or downstream over a network. The network node 400 also includes a processor 430 including a logic unit and/or central processing unit (CPU) to process the data and a memory 432 for storing the data. The network node 400 may also comprise optical-to-electrical (OE) components, electrical-to-optical (EO) components, and/or wireless communication components coupled to the upstream ports 450 and/or downstream ports 420 for communication of data via optical or wireless communication networks. The network node 400 may also include input and/or output (I/O) devices for communicating data to and from a user in some cases.

The processor 430 is implemented by hardware and software. The processor 430 may be implemented as one or more CPU chips, cores (e.g., as a multi-core processor), field-programmable gate arrays (FPGAs), application specific integrated circuits (ASICs), and digital signal processors (DSPs). The processor 430 is in communication with the downstream ports 420, Tx/Rx 410, upstream ports 450, and memory 432. The processor 430 comprises a LSFR module 414. The LSFR module 414 implements the disclosed embodiments described herein. Specifically, the LSFR module 414 may build a flooding topology based on connectivity information. The LSFR module 414 may build the flooding topology by employing several mechanisms, such as by methods 500, 600, and/or 700 as discussed below. The LSFR module 414 may also add a number of leaf links to the flooding topology as directed by a user/system administrator. The LSFR module 414 may store the flooding topology in memory 432. The LSFR module 414 may then receive and/or flood link state messages, such as OSPF LSAs and/or IS-IS LSPs, over an IGP network via the flooding topology by employing the downstream ports 420, Tx/Rx 410, and/or upstream ports 450. The LSFR module 414 may also employ case specific handling of link state messages as discussed with respect to the FIGS. below. For example, the LSFR module 414 may add new nodes to the flooding topology upon startup as well as forward link state messages outside of the flooding topology in case of link/node failures. The LSFR module 414 may also maintain awareness of critical elements, and revert to general flooding of link state messages in the event of a critical element failure. These and other mechanisms implemented by LSFR module 414 are discussed in more detail with respect to the FIGS. below. Further, LSFR module 414 effects a transformation of the network node 400 to a different state. Alternatively, the LSFR module 414 can be implemented as instructions stored in the memory 432 and executed by the processor 430 (e.g., as a computer program product stored on a non-transitory medium).

The memory 432 comprises one or more memory types such as disks, tape drives, solid-state drives, read only memory (ROM), random access memory (RAM), flash memory, ternary content-addressable memory (TCAM), static random-access memory (SRAM), etc. The memory 432 may be used as an over-flow data storage device, to store programs when such programs are selected for execution, and to store instructions and data that are read during program execution.

FIGS. 5, 6, and 7 depict example methods of building a flooding topology. Generally, building a flooding topology includes 1) selecting a node R according to a rule, such as the node with the biggest/smallest node ID; 2) building a tree using R as the root of the tree; and 3) connecting k (k>=0) leaves to the tree as desired to add equipment failure mitigation to the flooding topology. In distributed mode, each of the nodes in the network uses the algorithm to generate a flooding topology, and thus the flooding topology is not distributed/flooded in the IGP network. Two example types of mechanisms are discussed below. One type of mechanism builds a tree for the flooding topology without checking whether the nodes support LSFR. Such a mechanism assumes that all the routers in the domain support LSFR. A second type of mechanism considers whether each node supports LSFR while building a tree for the flooding topology. Such mechanisms place nodes that support LSFR closer to the root node in order to allow the nodes that support LSFR to be continuously connected to the flooding topology. Support for LSFR can be signaled in a F flag, which can be included in an IS-IS router capability type length value (TLV) and/or an OSPF LSA. For example, the F flag can be set to one to indicate the node/router supports LSFR and set to zero to indicate that the node/router does not support LSFR. The root node can then be selected according to a corresponding rule, for example as the node with the biggest/smallest node ID that also supports LSFR (e.g., among the nodes with an F flag set to one).

FIG. 5 is a flowchart of an example method 500 of building a flooding topology, such as flooding topology 219 and/or 319. Accordingly, method 500 may be employed by a node 111, 211, 212, 213, 311, 312, and/or 400. Method 500 is a mechanism for building a tree from a root node R with a candidate queue (Cq) initially containing node R and initially an empty flooding topology Ft.

At block 501, flooding topology generation is initiated. For example, flooding topology can be recalculated when there are changes in the network. As another example, a flooding topology can be recalculated upon the occurrence of an event. Specifically, a flooding topology can be recalculated upon failure of a critical element. As another example, a flooding topology can be recalculated upon receiving a message from a user/system administrator requesting a recalculation. As noted above, in distributed mode, method 500 is substantially simultaneously initiated on each node in the network that is LSFR capable.

At block 503, a root node for the flooding topology is selected, for example based on ID number. The selected root node is added to an empty candidate queue. Further, a flooding topology may be initialized as empty at block 503. The method 500 then proceeds to block 505, which forms an iterative loop with blocks 507, 511, and 513.

Block 505 varies depending on whether the method 500 considers which nodes support LSFR. If the method 500 does not consider which nodes support LSFR, block 505 removes the first node from the candidate queue and adds the removed node to the flooding topology. If the removed node is not the root node, (e.g., the flooding topology is not empty prior to addition of the removed node), a link between the removed node and the last node added to the flooding topology is also included in the flooding topology. As such, block 505 iterates through the candidate queue in order from the root node and positions nodes on the flooding topology.

If method 500 does consider which nodes support LSFR, block 505 removes the first node from the candidate queue that also supports LSFR. When no nodes in the candidate queue support LSFR, the first node in the candidate queue (that doesn't support LSFR) is removed from the candidate queue. The removed node, and a corresponding link to the previous node in the flooding topology if applicable, is then added to the flooding topology. In this manner, block 505 can position nodes that support LSFR in positions on the flooding topology that are closer to the root node. This results in positioning nodes that do not support LSFR farther away from the root node, and hence reduces reliance on such nodes for communicating link state data across the flooding topology.

At block 507, the list of nodes in the network is compared to the list of nodes on the flooding topology. When all nodes have been added to the flooding topology, the method 500 proceeds to block 509 and returns a completed flooding topology FT. When at least one node is not included in the flooding topology FT, the method 500 proceeds to block 511.

Block 511 varies depending on whether the method 500 considers which nodes support LSFR. If the method 500 does not consider which nodes support LSFR, block 511 determines a list of nodes Xi (i=1, 2, 3, . . . n) connected to the last node added to the flooding topology, where such nodes are not already in the flooding topology. Such nodes Xi may then be sorted by link cost and/or link/node/interface ID. Link cost may indicate latency, link length, or link maximum bandwidth, and/or other link capabilities. Further, link cost may indicate a cost between the last node added to the flooding topology and a corresponding node Xi. Such an approach may be employed to position nodes Xi with lower cost links higher in the candidate queue. Hence, such lower cost links are more likely to be added closer to the root node and be more heavily utilized in the flooding topology. When cost is identical, link/node/interface ID can be employed to determine order. If the method 500 does consider which nodes support LSFR, block 511 may consider LSFR support when determining cost. For example, real metrics can be employed to determine costs for nodes that support LSFR. Further, the real metrics for node(s) that do not support LSFR can be scaled by a factor such that the lowest cost non-LSFR metrics are higher than the highest cost LSFR metrics. By employing costs in this fashion, nodes that do not support LSFR are positioned at the end of the candidate queue. This further supports placing nodes that do not support LSFR as far away from the root node as possible.

At block 513, the nodes Xi from block 511 are added to the end of the candidate queue in order as sorted in block 511. The method 500 may then return to block 505 to add the next node from the candidate queue onto the flooding topology.

By employing the abovementioned approach, the flooding topology grows as a balanced tree starting at the root node. The root node is added to the flooding topology first. Then each of the nodes connected to the root node (e.g., first degree nodes) are added to the flooding tree. Then each node connected to the nodes connected to the root node (e.g., second degree nodes connected to a first degree node) is added to the flooding tree. This process continues until all nodes are added to the flooding topology along with corresponding links.

FIG. 6 is a flowchart of another example method 600 of building a flooding topology, such as flooding topology 219 and/or 319. Accordingly, method 600 may be employed by a node 111, 211, 212, 213, 311, 312, and/or 400. Method 600 is a mechanism for building a tree from a root node R with a candidate queue initially containing node R and initially an empty flooding topology Ft. Method 600 employs blocks 601, 603, 605, 607, 609, and 611, which are substantially similar to blocks 501, 503, 505, 507, 509, and 511, respectively. Method 600 also employs block 613, which is similar to block 513. However, block 613 adds nodes Xi from block 611 to the end of the candidate queue instead of to the beginning of the candidate queue. Method 600 may consider whether such nodes are capable of LSFR when sorting nodes Xi, or method 600 may operate without consideration of LSFR capability (e.g., in a manner substantially similar to method 500).

Accordingly, method 600 is substantially similar to method 500, but the flooding tree grows differently. Specifically, the tree grows along the first branch from the root node until all nodes connected to the first branch are added to the flooding topology. Then nodes attached to the second branch from the root node (that have not already been added) are added to the flooding topology, etc. If LSFR capability is considered, nodes that are not LSFR capable can still be placed later in the sequence due to sorting at block 611.

FIG. 7 is a flowchart of another example method 700 of building a flooding topology such as flooding topology 219 and/or 319. Accordingly, method 700 may be employed by a node 111, 211, 212, 213, 311, 312, and/or 400. Method 700 is a mechanism for building a tree from a root node R with a candidate queue initially containing node R and initially an empty flooding topology Ft. Method 700 employs blocks 701, 703, 705, 707, and 709, which are substantially similar to blocks 501, 503, 505, 507, and 509, respectively. Method 700 also includes blocks 711 and 713, which are similar to blocks 511 and 513, respectively. However, blocks 711 and 713 orders nodes Xi in the candidate queue based on the cost back to the root node instead of based on ID or the cost back to the previous node in the flooding topology.

Specifically, block 711 determines the lowest cost to the root node for each node Xi coupled to the last node added to the flooding topology at block 705. In examples that consider LSFR capability, routes that traverse nodes that do not support LSFR can be assigned increased costs to ensure such routes are excluded and/or only employed on the flooding topology when no complete LSFR supporting path is available. Nodes Xi coupled to the last node added to the flooding topology are added to the candidate queue along with associated shortest costs back to the root node. In the event a node Xi was previously included in the candidate queue during a previous iteration due to connection to another node already in the flooding topology, the new cost to the root node is compared to the previous cost to the root node. The cost is then updated if the new cost is less than the previous cost. This approach causes each node to be considered in the candidate queue based on the lowest cost back to the root node during each iteration. The candidate queue is then sorted by costs back to the root node and/or based on interface/node/link ID.

Accordingly, method 700 is substantially similar to method 500, but the flooding tree grows differently. For example, the flooding topology of method 700 grows by adding nodes in order of lowest cost back to the root node. This approach causes the flooding topology to be populated primarily with lowest cost paths. Further, lowest cost paths are positioned in the flooding topology so that such paths are employed with the greatest amount of link state traffic. Accordingly, higher cost paths are either excluded or only included in the flooding topology as a last resort to ensure full connectivity. Hence, use of such higher cost paths and/or use of paths that traverse a non-LSFR capable device are employed for the least amount of link state traffic.

Employing a flooding topology, for example as generated according to methods 500, 600, and 700, may result in certain issues. For example, certain mechanisms may be employed to ensure that each node in the network obtains a complete flooding topology in a short time when changes occur in the network, particularly when multiple link or node failures occur. One approach to mitigate such issues is to cause nodes to maintain/compute a redundant flooding topology. Such redundant flooding topology may include a basic flooding topology for flooding changes excluding down links or nodes. In addition, the redundant flooding topology may comprise the information (such as flooding paths) for a link or node failure as well as for multiple link or node failures. Another mechanism that may be employed is a mechanism to account for changes at the root node. For example, when a node X finds out that the root node R used to compute a flooding tree is down or not reachable, node X selects a new root node R according to some rule such as the node with smallest/largest node ID. The node X then computes a flooding tree as discussed above and builds the flooding topology based on the flooding tree (e.g., immediately). Further, when a new node is added into the existing topology and is reachable, the node X may check to determine whether the new node is a new root for a flooding tree according to a root node selection rule, such as the new nodes ID is the new smallest/largest node ID. If the new node is the new root node, node X computes a flooding tree using new node R as the root and builds the flooding topology based on the flooding tree after a predefined interval of time, such as five seconds.

Figure 8:
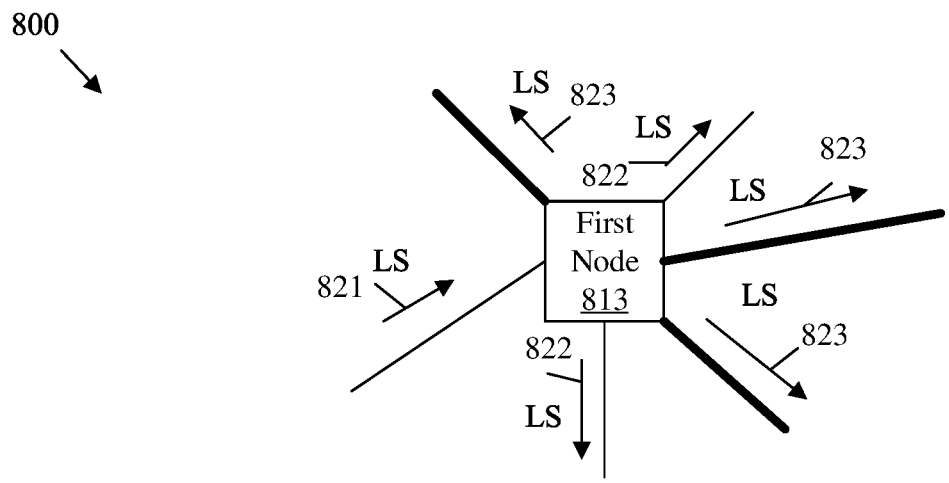
FIG. 8 is a schematic diagram of an example flooding mechanism.

FIG. 8 is a schematic diagram of an example flooding mechanism 800, which may be employed in an IGP network, such as IGP network 100, 200, and/or 300. The flooding mechanism 800 is employed with respect to a first node 813, which can be any node in an IGP network (e.g., node 111, 211, 212, 213, 311, 312, and/or 400) that employs a flooding topology, such as flooding topology 219 and/or 319. Such flooding topology can be generated, for example, according to method 500, 600, and/or 700.

As shown for purposes of illustration, the node 813 is coupled to links 817 that are excluded from the flooding topology and links 816 that are included in the flooding topology. As noted above, a node 813 generally receives link state information from a flooding topology and floods such link state information over other interfaces coupled to the flooding topology. However, certain cases can occur where a node 813 receives link state information from a link 817 that is not included in the flooding topology. For example, a node 813 may receive a link state message 821 from a node that is not LSFR capable, and hence has flooded the link state message 821 on all interfaces. As another example, the node 813 may receive a link state message 821 from outside the flooding topology when a node/link has malfunctioned. Accordingly, the node 813 can take various actions, depending on the example. In one example, if the link state message 821 is received from a link 817 that is not on the flooding topology, the node 813 sends a link state message 823 and 822 to the node's 813 neighbors over all the other links 816 and 817 that are attached to the node 813 excluding the link 817 from which the link state message 821 is received (e.g., the link state flooding follows the real network topology). Note that messages 822 and 823 are copies of message 821. In another example, if the link state message 821 is received from a link 817 that is not on the flooding topology, the node 813 sends a link state message 823 to the node's 813 neighbors over all the links 816 that are attached to node 813 and are included on the flooding topology. Hence, the node 813 may be configured to receive a link state message 821 across a link 817 that is excluded from the flooding topology, and flood the link state message 822 outside of the flooding topology.

Figure 9:
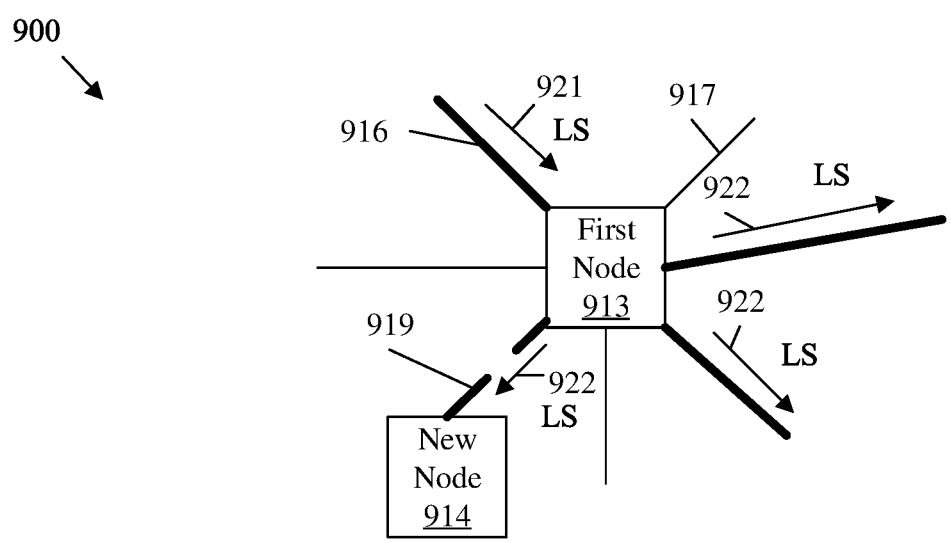
FIG. 9 is a schematic diagram of an example flooding mechanism employed upon discovering a new node.

FIG. 9 is a schematic diagram of an example flooding mechanism 900 employed by a first node 913 upon discovering a second new node 914. Flooding mechanism 900 may be employed in an IGP network, such as IGP network 100, 200, and/or 300. The flooding mechanism 900 is employed with respect to a node 913, which can be any node in an IGP network (e.g., node 111, 211, 212, 213, 311, 312, and/or 400) that employs a flooding topology, such as flooding topology 219 and/or 319. Such flooding topology can be generated, for example, according to method 500, 600, and/or 700. Flooding mechanism 900 can be employed with a flooding mechanism 800 when the new node 914 is discovered.

Mechanism 900 illustrates an approach for adjusting link state flooding when a new node 914 is connected to a node 913, denoted as a first node 913, which is already operating on the network. Mechanism 900 may be triggered when the first node 913 establishes an adjacency with the newly connected new node 914. As shown, the newly connected new node 914 is directly connected to the first node 913 via a link 919. The first node 913 assumes that the new node 914 is coupled to the flooding topology via the corresponding link 919 until the flooding topology can be rebuilt (e.g., after there is a change in the network). As such, link 919 is temporally labeled as a flooding topology link in the memory of the first node 913. Accordingly, the link 919 is employed to add the newly connected new node 914 to the tree of links in the flooding topology until the flooding topology is recomputed. After the new node 914 is added to the flooding topology, the first node 913 may receive a link state message 921 over a link 916 in the flooding topology. The first node 913 may then forward the link state message 922 (a copy of message 921) across both the flooding topology links 916 and the link 919 to the new node 914. The link state message 921 may not be forwarded to links 917 that are otherwise excluded from the flooding topology.

Figure 10:
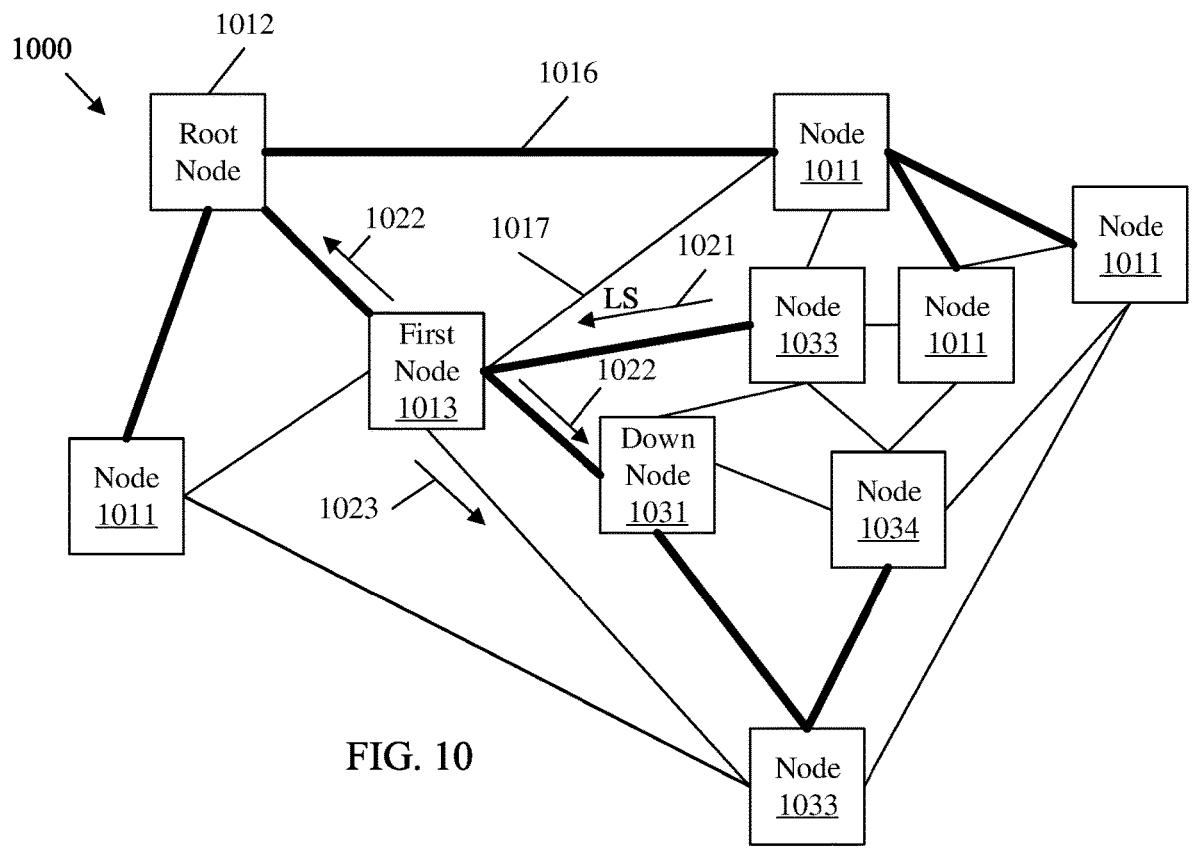
FIG. 10 is a schematic diagram of an example flooding mechanism employed upon discovering a node has gone down.

FIG. 10 is a schematic diagram of an example flooding mechanism 1000 employed upon discovering a node has malfunctioned, (e.g., gone down). The flooding mechanism 1000 operates on an IGP network, such as IGP network 100, 200, and/or 300. The flooding mechanism 1000 is illustrated with respect to a first node 1013, which can be any node in an IGP network (e.g., node 111, 211, 212, 213, 311, 312, and/or 400) that employs a flooding topology, such as flooding topology 219 and/or 319. Such flooding topology can be generated, for example, according to method 500, 600, and/or 700. Flooding mechanism 1000 can be employed with flooding mechanisms 800 and/or 900 when a down node 1031 malfunctions.

As shown, mechanism 1000 operates on an IGP network with nodes 1011, a root node 1012, and a first node 1013 connected by links 1017 and flooding topology links 1016, which are substantially similar to nodes 211, root node 212, first node 213, links 217, and flooding topology links 216, respectively. Mechanism 1000 may operate on any node, and is illustrated from the perspective of the first node 1013 for clarity of discussion. Mechanism 1000 may be initiated when the first node 1013 receives a new link state message 1021 from a neighbor node 1033 over a flooding topology link 1016. The link state message 1021 indicates that the down node 1031 is not functioning. The down node 1031 is a neighbor with nodes 1033, which are also neighbors of the first node 1013. The down node 1031 is a neighbor with node 1034, which is not a neighbor of the first node 1013.

When the link state message 1021 is received from a flooding topology link 1016, the first node 1013 sends the link state message 1022 (a copy of message 1021) to the first node's 1013 neighbors over the flooding topology links 1016, excluding the flooding topology links 1016 from which the link state message 1021 was received. This ensures the new link state message 1021 is properly forwarded over the flooding topology. The first node 1013 also sends the link state message 1023 (another copy of message 1021) to the nodes 1033 that are neighbors to both the first node 1013 and the down node 1031. Such link state messages 1023 are sent over the links 1017 that attach the first node 1013 to the nodes 1033, even though such links 1017 are not included in the flooding topology. This mechanism 1000 considers that the nodes neighbors 1033 may rely on the down node 1031 for link state messages 1021. Hence, the first node 1013 notifies neighbor nodes 1033 of the down node 1031 to ensure that the link state message 1021 is propagated to such nodes 1033. The first node 1013 may not forward the link state message 1021 to the remaining neighbor node 1034 of the down node 1031, because the node 1034 is not a neighbor of the first node 1013. The mechanism relies on a neighbor of node 1034 to inform node 1034 that the down node 1031 is not operational. This approach prevents every node in the network from contacting all other nodes when a down node 1031 malfunctions.

As such, the first node 1013 may receive a link state message 1021 (e.g., a third link state message for distinction from other link state messages discussed herein) indicating a second down node 1031 in the network is down. The first node 1013 may then flood the link state message 1021 to links 1017 that are excluded from the flooding topology and connect between the first node 1013 and neighbor nodes 1033 of the down node 1031.

Figure 11:
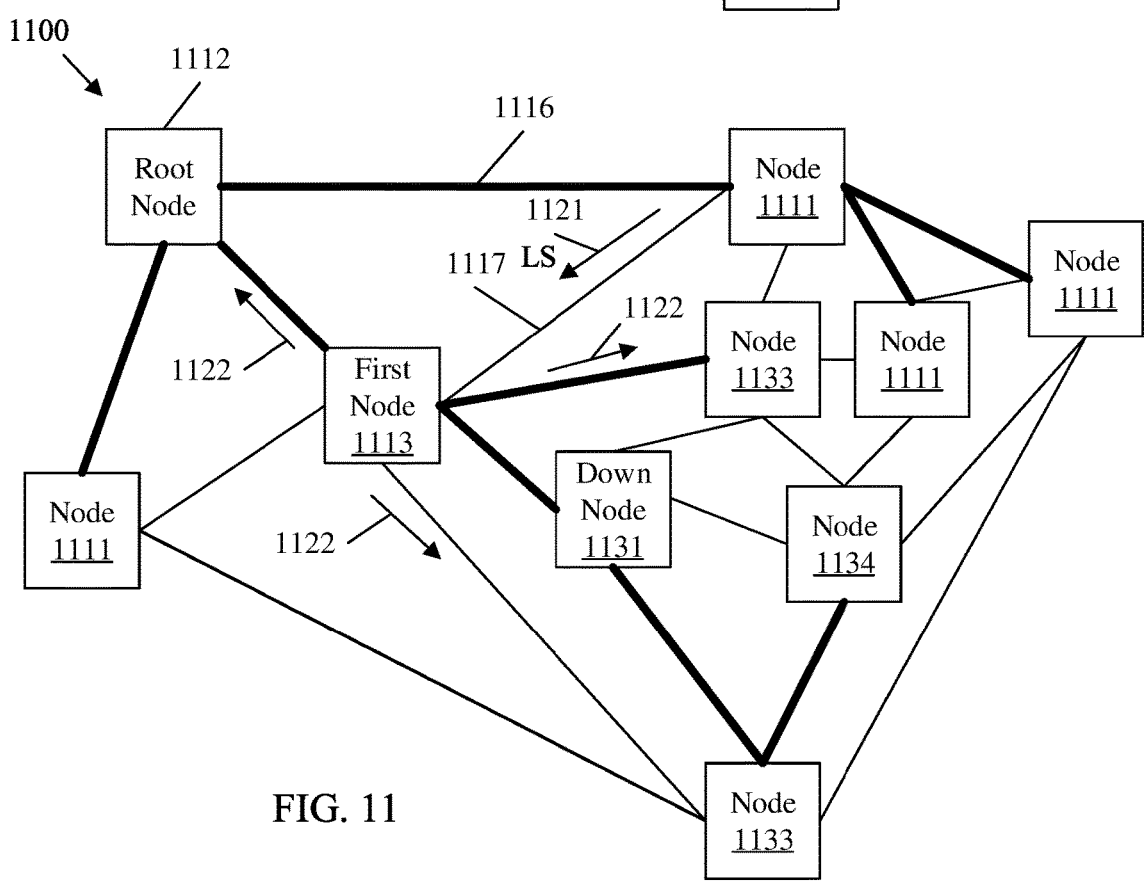
FIG. 11 is a schematic diagram of another example flooding mechanism employed upon discovering a node has gone down.

FIG. 11 is a schematic diagram of another example flooding mechanism 1100 employed upon discovering a node has malfunctioned, (e.g., gone down). The flooding mechanism 1100 operates on an IGP network, such as IGP network 100, 200, and/or 300. The flooding mechanism 1100 is illustrated with respect to a first node 1113, which can be any node in an IGP network (e.g., node 111, 211, 212, 213, 311, 312, and/or 400) that employs a flooding topology, such as flooding topology 219 and/or 319. Such flooding topology can be generated, for example, according to method 500, 600, and/or 700. Flooding mechanism 1100 can be employed with flooding mechanisms 800 and/or 900 when a down node 1131 malfunctions.

As shown, mechanism 1100 operates on an IGP network with nodes 1111, a root node 1112, and a first node 1113 connected by links 1117 and flooding topology links 1116, which are substantially similar to nodes 1011, root node 1012, first node 1013, links 1017 and flooding topology links 1016, respectively. Further, a down node 1131 malfunctions, which is similar to down node 1031. Also, the network contains nodes 1133 that are neighbors to the first node 1113 and the down node 1131, and a node 1134 that is a neighbor of the down node 1031 and not a neighbor of the first node 1113.

Mechanism 1100 is similar to mechanism 1000, but is employed when a first node 1113 receives a new link state message 1121 from a neighbor node over a link 1117 that is not on the flooding topology. The link state message 1121 contains information indicating the down node 1131 is down/malfunctioning. In one example, the first node 1113 sends the link state message 1121 to all neighbor nodes over all the links 1116 and 1117 that are connected to the first node 1113 excluding the link 1117 from which the link state message 1121 was received. Such a response is substantially similar to mechanism 800 and allows the link state message 1121 to flood by following the real network topology. Such an example presumes the first node 1113 is not properly receiving link state messages over the flooding topology and takes action to ensure the link state message 1121 is transmitted as widely as possible.

In another example, the first node 1113 floods the link state message 1122 (a copy of message 1121) over the flooding topology links 1116. The first node 1113 also floods the link state message 1122 to nodes 1133 that are neighbors to both the first 1113 node and the down node 1131 over links 1117 that are not on the flooding topology. The link state message 1122 need not be forwarded back on the link 1117 from which the link state message 1121 was received. Further, the first node 1113 may not forward the link state message 1121 to the remaining neighbor node 1134 of the down node 1131, because the node 1134 is not a neighbor of the first node 1113. Such an example focuses on forwarding link state information along the flooding topology and informing the down node's 1131 neighbors of the malfunction.

In either example, the first node 1113 receives a link state message 1121 (e.g., a third link state message for distinction from other link state messages discussed herein) indicating a second down node 1131 in the network is down. The first node 1113 then floods the link state message 1122 to links 1117 that are excluded from the flooding topology and connect between the first node 1113 and neighbor nodes 1133 of the down node 1131.

Figure 12:
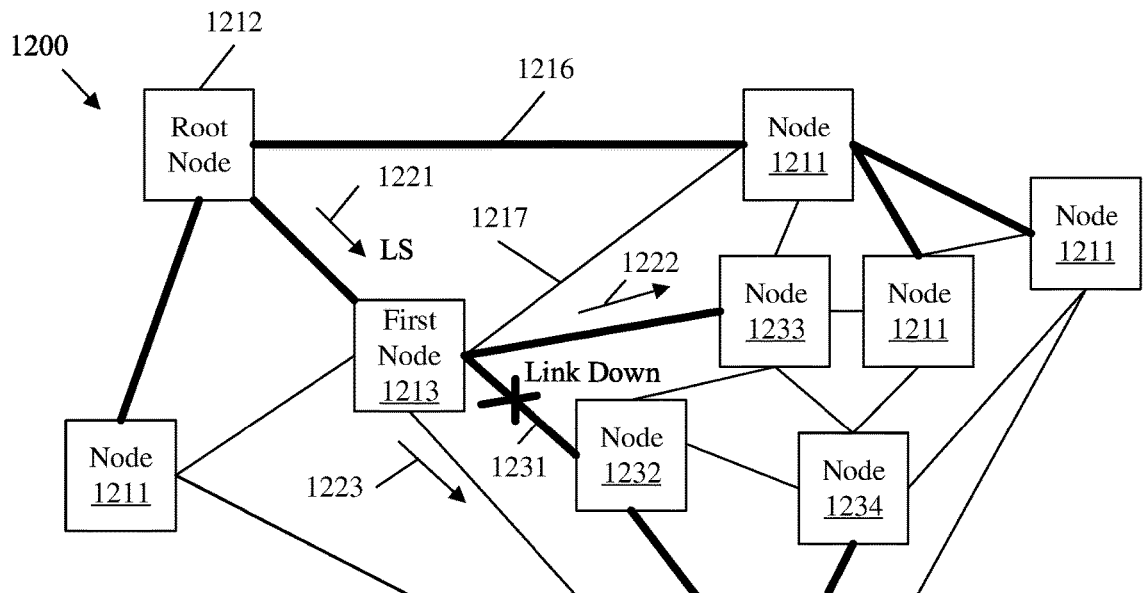
FIG. 12 is a schematic diagram of an example flooding mechanism employed upon discovering a link has gone down.

FIG. 12 is a schematic diagram of an example flooding mechanism 1200 employed upon discovering a link 1231 has malfunctioned, (e.g., gone down). The flooding mechanism 1200 operates on an IGP network, such as IGP network 100, 200, and/or 300. The flooding mechanism 1200 is illustrated with respect to a first node 1213, which can be any node in an IGP network (e.g., node 111, 211, 212, 213, 311, 312, and/or 400) that employs a flooding topology, such as flooding topology 219 and/or 319. Such flooding topology can be generated, for example, according to method 500, 600, and/or 700. Flooding mechanism 1200 can be employed with flooding mechanisms 800, 900, 1000, and/or 1100 when a link 1231 goes down/malfunctions.

As shown, mechanism 1200 operates on an IGP network with nodes 1211, a root node 1212, and a first node 1213 connected by links 1217 and flooding topology links 1216, which are substantially similar to nodes 1011, root node 1012, first node 1013, links 1017 and flooding topology links 1016, respectively. Further, a down link 1231 malfunctions. A node 1232 is coupled to the first node 1213 via the down link 1231. Nodes 1233 are neighbors to both the first node 1213 and the node 1232 adjacent to the down link 1231. Node 1234 is a neighbor to the node 1232 (adjacent to the down link), but is not a neighbor of the first node 1213.

The first node 1213 finds out that a link 1231 is down upon receiving a newer link state message 1221 from a neighbor node, in this case root node 1212, over a link, in this case a flooding topology link 1216. The first node 1213 first checks to determine whether the down link 1231 is on the flooding topology. If the down link 1231 is not on the flooding topology, the down link 1231 does not affect link state flooding and no action need be taken beyond forwarding the link state message 1222 (a copy of message 1221) across the flooding topology. In the example shown, the down link 1231 is on the flooding topology, so the first node 1213 proceeds to check whether the down link 1231 is on a neighboring interface to the first node 1213. If the down link 1231 is not on a neighboring interface, the first node 1213 can allow nodes that are adjacent to the down link 1231 to handle any signaling, and hence can take no action beyond forwarding the link state message 1222 across the flooding topology. This approach prevents every node in the network from signaling upon discovering a down link 1231. In the example shown, the down link 1231 is adjacent to the first node 1213, so the first node 1213 takes on signaling reasonability to ensure nodes that might depend on the down link 1231 continue to receive link state information until the flooding topology can be recalculated. In this case, the first node 1213 sends the link state message 1222 across the flooding topology to each flooding topology link 1216 except for the flooding topology link 1216 from which the link state message 1221 was received. Further, the first node 1213 sends the link state message 1223 (another copy of message 1221) over links 1217 that are excluded from the flooding topology as necessary to contact nodes 1233 that are neighbors to both the first node 1213 and the node 1232 adjacent to the down link 1231. Further, the first node 1213 may not forward the link state message 1221 to the remaining neighbor node 1234 of the node 1232, because the node 1234 is not a neighbor of the first node 1213. This approach allows nodes 1233 that potentially rely on the down link 1231 to receive link state information to continue to receive such link state information despite the broken flooding topology.

Hence the first node 1213, by employing mechanism 1200, can receive a link state message 1221 (e.g., a fourth link state message for distinction from other link state messages discussed herein) indicating a link 1231 (e.g., a first link) in the network is down. The first node 1213 can determine that the first link 1213 is in the flooding topology and that the first link 1231 is connected to the first node 1213. Based on the determination, the first node 1213 can then send the link state message 1221 to links 1216 and/or 1217 that connect to neighbors which also connect to a node 1232 adjacent to the first link.

It should be noted that when a link 1231 on an existing/old flooding topology is down or a node is down (e.g., as discussed in mechanisms 1000 and 1100), a new flooding topology is generated shortly thereafter. The mechanisms 1000, 1100, and/or 1200 allow the existing flooding topology to continue to operate until the new flooding topology can be computed and employed by the nodes. The above-mentioned mechanisms 1000, 1100, and 1200 allow the network to continue to function when a link or node goes down as long as the network topology is not split into multiple isolated flooding topologies by the malfunction. Critical interfaces can be saved in memory to deal with such scenarios as discussed below.

Figure 13:
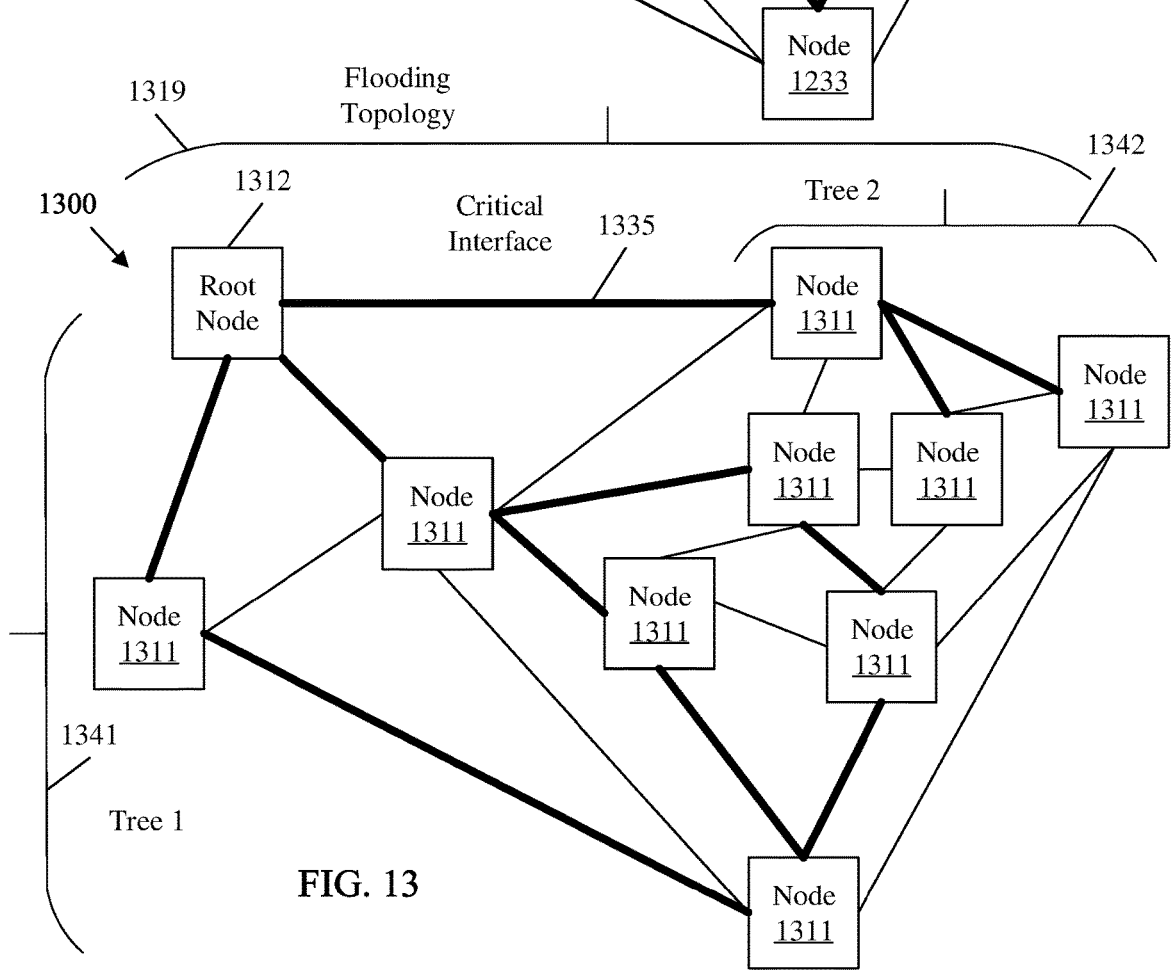
FIG. 13 is a schematic diagram of an example IGP network with a critical interface in the flooding topology.

FIG. 13 is a schematic diagram of an example IGP network 1300 with a critical interface 1335 in the flooding topology 1319. The IGP network 1300 is substantially similar to IGP network 100, 200, and/or 300. The IGP network 1300 includes nodes 1311 and a root node 1312, which may be similar to nodes 111, 211, 212, 213, 311, 312, and/or 400. The IGP network 1300 flooding topology 1319 may be similar to flooding topology 219 and/or 319. Such flooding topology 1319 can be generated, for example, according to method 500, 600, and/or 700. The nodes 1311 and root node 1312 may employ flooding mechanisms 800, 900, 1000, 1100, and/or 1200.

Upon computing the flooding topology 1319, the nodes 1311 and root node 1312 maintain awareness of any critical interface 1335 in the flooding topology 1319. A critical interface 1335 is any interface (e.g., link or node) on the flooding topology 1319 that, if removed, would split the flooding topology 1319 into two or more unconnected topologies of links. In the example shown, the flooding topology 1319 contains multiple loops of flooding topology links. When a flooding topology link in a loop is removed, the flooding topology 1319 can still forward link state information to all the nodes on the loop through the undamaged portion of the loop. Hence, such links are not critical interfaces. However, if critical interface 1335 is removed from the flooding topology 1319, the flooding topology 1319 is split into a first tree 1341 and a second tree 1342. In the absence of the critical interface 1335, the first tree 1341 and the second tree 1342 cannot communicate link state information as no flooding topology 1319 link would connect the two trees.

The critical interface(s) 1335 can be determined at each node 1311/1312 during/after computing flooding topology 1319 and be saved in memory. The number of critical interfaces 1335 can be reduced by adding more leaf links as discussed above. When a link or node associated with a critical interface 1335 malfunctions, the nodes 1311/1312 (upon notification of the malfunction via link state messages) may revert to flooding link state messages on all interfaces until a new flooding topology 1319 can be generated to address the failure of the critical interface and reconnect all the nodes 1311/1312.

Hence nodes 1312/1311 may determine critical interfaces 1335, where a critical interface 1335 is a link or node whose failure splits the flooding topology 1319. The nodes 1312/1311 can discontinue use of the flooding topology 1319 when a critical interface 1335 fails.

FIG. 14 is a schematic diagram of an example OSPF v2 encoding 1400 for indicating node support for LSFR. For example, a node, such as nodes 111, 211, 212, 213, 311, 312, 400, 1311, 1312, and/or 1333, in an IGP network, such as IGP network 100, 200, 300, and/or 1300, may employ the encoding 1400 to indicate whether the node supports LSFR. Such information may be employed by other nodes when building a flooding topology, for example based on methods 500, 600, and/or 700. OSPF v2 nodes employing LSFR, and hence employing encoding 1400, may also employ flooding mechanisms 800, 900, 1000, 1100, and/or 1200.

Encoding 1400 can be employed to incorporate LSFR into an IGP network that is compatible with OSPF v2. Specifically, encoding 1400 can be included in an OSPF v2 LSA. Encoding 1400 includes an LS age field 1401 set to indicate a time (e.g., in seconds) since the LSA was originated. The LSA age field 1401 may be sixteen bits long and may extend from bit zero to bit fifteen. The encoding 1400 also includes an options field 1402 that may contain data indicating optional capabilities supported in a portion of a routing domain in an IGP network as described by the LSA. The options field 1402 may be eight bits long and may extend from bit sixteen to bit twenty three. The encoding 1400 also includes an LS type field 1403 that can be set to indicate the type of the LSA. For example, the LS type field 1403 can be set to one to indicate the LSA is a router (e.g., node) LSA. The LS type field 1403 may be eight bits long and may extend from bit twenty four to bit thirty one. The encoding 1400 also includes a link state ID field 1404 that includes data that identifies the portion of the internet environment that is being described by the LSA. For example, the link state ID field 1404 can be set to indicate that the LSA describes the collected states of a router's interfaces. The link state ID field 1404 may be thirty two bits long and may extend from bit zero to bit thirty one. The encoding 1400 also includes an advertising router field 1405 that contains the router ID of the router originating the LSA. The advertising router field 1405 may be thirty two bits long and may extend from bit zero to bit thirty one. The encoding 1400 also includes an LS sequence number field 1406 that contains data for identifying the LSA. The LS sequence number field 1406 data can be employed to detect old or duplicate LSAs. The LS sequence number field 1406 may be thirty two bits long and may extend from bit zero to bit thirty one. The encoding 1400 also includes an LS checksum field 1407 containing checksum data to support error checking. The LS checksum field 1407 may be sixteen bits long and may extend from bit zero to bit fifteen. The encoding 1400 also includes an LS length field 1408 containing data indicating the length of the LSA in bytes. The LS length field 1408 may be sixteen bits long and may extend from bit sixteen to bit thirty one.

The encoding 1400 also includes various flags employed to indicate various characteristics for the router initiating the LSA. The encoding can include a virtual (V) flag 1421 at bit position five, which can be set to indicate when the router is an endpoint to one or more adjacent virtual links. The encoding can also include an external (E) flag 1422 at bit position six, which can be set to indicate when the router is an autonomous system boundary router. The encoding can also include a border (B) flag 1423 at bit position seven, which can be set to indicate when the router is a border area router.

The encoding 1400 also includes an F flag 1431. The F flag 1431 may be one bit and may be positioned at bit position eight. The F flag 1431 can be set (e.g., set to one) to indicate that the router initiating the LSA supports flooding reduction (e.g., according to the LSFR mechanisms discussed herein). The bit position of the F flag 1431 can also be unset (e.g., set to zero) by default so that routers that do not support LSFR can be identified by routers receiving the LSA. As such, the encoding 1400 allows link state messages to contain F flags set to indicate the nodes in the network that support link state flooding reduction via a flooding topology.

The encoding 1400 also includes a number of links field 1409 that indicate the number of links described by the LSA. The number of links field 1409 may be sixteen bits long and may extend from bit position sixteen to bit position thirty one. The encoding 1400 also includes a link ID field 1410 for each link described by the LSA. The link ID field 1410 includes an ID that identifies the object (e.g., node) to which the corresponding link is connected. The link ID field 1410 may be thirty two bits long and may extend from bit zero to bit thirty one. The encoding 1400 also includes a link data field 1411 for each link described by the LSA. The link data field 1411 includes address information (e.g., IP address information) related to the corresponding link/interface. The link data field 1411 may be thirty two bits long and may extend from bit zero to bit thirty one.

The encoding 1400 also includes a type field 1412 for each link described by the LSA. The type field 1412 contains data describing the router link. The type field 1412 may be eight bits long and may extend from bit zero to bit seven. The encoding 1400 also includes a number of type of service (ToS) fields 1413 for each link described by the LSA. The number of the ToS field 1413 indicates a number of ToS metrics for the corresponding links that are included in the LSA. The number of the ToS field 1413 may be eight bits long and may extend from bit eight to bit fifteen. The encoding 1400 also includes a metric field 1414 that includes the cost (e.g., routing cost/latency, etc.) of using the corresponding link. The metric field 1414 may be sixteen bits long and may extend from bit sixteen to bit thirty one. The encoding 1400 may also include ToS fields 1415 and ToS metric fields 1416 indicating ToS information associated with the corresponding link. The Tos field 1415 indicates the type of service referred to by the ToS metric field 1416, may be eight bits long, and may extend from bit position zero to bit position seven. The Tos metric field 1416 may indicate ToS specific information for the link, may be sixteen bits long, and may extend from bit sixteen to bit thirty one.

Figure 15:
FIG. 15 is a schematic diagram of an example OSPF version three (v3) encoding for indicating node support for LSFR.

FIG. 15 is a schematic diagram of an example OSPF v3 encoding 1500 for indicating node support for LSFR. For example, a node, such as nodes 111, 211, 212, 213, 311, 312, 400, 1311, 1312, and/or 1333, in an IGP network, such as IGP network 100, 200, 300, and/or 1300, may employ the encoding 1500 to indicate whether the node supports LSFR. Such information may be employed by other nodes when building a flooding topology, for example based on methods 500, 600, and/or 700. OSPF v3 nodes employing LSFR, and hence employing encoding 1500, may also employ flooding mechanisms 800, 900, 1000, 1100, and/or 1200.

Encoding 1500 can be employed to incorporate LSFR into an IGP network that is compatible with OSPF v3. Specifically, encoding 1500 can be included in an OSPF v3 LSA. The encoding 1500 may include an LS age field 1501, a LS type field 1503, a link state ID field 1504, an advertising router field 1505, an LS sequence number field 1506, an LS checksum field 1507, and an LS length field 1508, which may be substantially similar to LS age field 1401, LS type field 1403, link state ID field 1404, advertising router field 1405, LS sequence number field 1406, LS checksum field 1407, and LS length field 1408, respectively. Unlike LS type field 1403, LS type field 1503 is sixteen bits long and extends from bit position sixteen to bit position thirty one.

The encoding 1500 also includes an options field 1509 that can be set to indicate optional capabilities supported by the router that initiated the LSA. The options field 1509 may be thirty two bits long and may extend from bit zero to bit thirty one. The options field 1509 includes various flags employed to indicate various characteristics for the router initiating the LSA. The options field 1509 may include a V flag 1521, an E flag 1522, and a B flag 1523, which may be substantially similar to V flag 1421, E flag 1422, and B flag 1423, respectively. The options field 1509 may also include a wildcard (W) flag 1524 that may be set to indicate the router initiating the LSA is a wildcard multicast receiver. The W flag 1524 may be one bit long and may be positioned at bit position four.

The options field 1509 also includes an F flag 1531. The F flag 1531 may be one bit and may be positioned at bit position eight. The F flag 1531 can be set (e.g., set to one) to indicate that the router initiating the LSA supports flooding reduction (e.g., according to the LSFR mechanisms discussed herein). The bit position of the F flag 1531 can also be unset (e.g., set to zero) by default so that routers that do not support LSFR can be identified by routers receiving the LSA. As such, the encoding 1500 allows link state messages to contain F flags set to indicate the nodes in the network that support link state flooding reduction via a flooding topology.

The encoding 1500 may also include a type field 1512 and a metric field 1514 for each link described by the LSA. The type field 1512 and metric field 1514 maybe substantially similar to the type field 1412 and metric field 1414, respectively. The encoding 1500 may also include an interface ID field 1510, a neighbor interface ID field 1515, and a neighbor router ID field 1516 for each link described in the LSA.

The interface ID field 1510, neighbor interface ID field 1515, and neighbor router ID field 1516 may each be thirty two bits long and extend from bit position zero to bit position thirty one. The interface ID field 1510 indicates an ID assigned to the interface (e.g., link) being described. The neighbor interface ID field 1515 indicates an interface ID of the neighboring router coupled to the link being described. The neighbor router ID field 1516 indicates the router ID of the neighboring router coupled to the link being described.

FIG. 16 is a schematic diagram of an example IS-IS encoding 1600 for indicating node support for LSFR. For example, a node, such as nodes 111, 211, 212, 213, 311, 312, 400, 1311, 1312, and/or 1333, in an IGP network, such as IGP network 100, 200, 300, and/or 1300, may employ the IS-IS encoding 1600 to indicate whether the node supports LSFR. Such information may be employed by other nodes when building a flooding topology, for example based on methods 500, 600, and/or 700. IS-IS nodes employing LSFR, and hence employing encoding 1600, may also employ flooding mechanisms 800, 900, 1000, 1100, and/or 1200.

Encoding 1600 can be employed to incorporate LSFR into an IGP network that is compatible with IS-IS. Specifically, encoding 1600 can be included as a TLV in an IS-IS LSP. The encoding 1600 includes a type field 1601 set to indicate that the encoding is an IS-IS router capable TLV. For example, the type field 1601 may be eight bits long, may extend from bit position zero to bit position seven, and may be set to two hundred forty two. The encoding 1600 includes a length field 1602, which may be eight bits long, may extend from bit position eight to bit position fifteen, and may be set to indicate the length of the TLV. The length field 1602 can be set to a value of between five and two hundred fifty five inclusive. The encoding 1600 also includes a router ID field 1603, which is thirty two or forty eight bits long, may extend from bit position sixteen to bit position fifteen or thirty one, and contains an ID of the router initiating the link state message. The encoding 1600 also includes a set of flags 1605 that indicate capabilities of the router initiating the link state message. The flags 1605 may be eight bits long and may extend from bit sixteen to bit twenty three. The flags 1605 include a de-looping (D) flag 1621 that may be positioned at bit position twenty two, and may be set to indicate whether the TLV can be leaked between levels in the IS-IS system. The flags 1605 also include a set (S) flag 1622 that may be positioned at bit position twenty three, and may be set to indicate whether the TLV is flooding across the entire IS-IS network domain or contained to a particular IS-IS network level.

The flags 1605 also include an F flag 1631, which may be positioned at bit position twenty one. The F flag 1631 can be set (e.g., set to one) to indicate that the router initiating the LSP supports flooding reduction (e.g., according to the LSFR mechanisms discussed herein). The bit position of the F flag 1631 can also be unset (e.g., set to zero) by default so that routers that do not support LSFR can be identified by routers receiving the LSP. As such, the encoding 1600 allows link state messages to contain F flags set to indicate the nodes in the network that support link state flooding reduction via a flooding topology.

The encoding 1600 may also include one or more optional sub-TLVs 1606 that contain additional information relevant to the LSP.

FIG. 17 is a schematic diagram of an example LSFR control TLV encoding 1700 for managing LSFR in an IGP network. For example, a node, such as nodes 111, 211, 212, 213, 311, 312, 400, 1311, 1312, and/or 1333, in an IGP network, such as IGP network 100, 200, 300, and/or 1300, may receive the LSFR control TLV encoding 1700 to control the implementation of LSFR in the network. Specifically, the LSFR control TLV encoding 1700 may allow a user/system administrator to select and/or switch operating modes for LSFR and associated flooding topologies. The LSFR control TLV encoding 1700 may be employed as part of a link state message, such as encoding 1400, 1500, and/or 1600. Such information may be employed by nodes when building a flooding topology, for example based on methods 500, 600, and/or 700. The LSFR control TLV encoding 1700 may also indicate to the nodes when to employ LSFR flooding mechanisms 800, 900, 1000, 1100, and/or 1200.

The LSFR control TLV encoding 1700 employs an information TLV type field 1701 that may include data identifying the TLV as an LSFR control TLV. The TLV type field 1701 may be sixteen bits long and may extend from bit position zero to bit position fifteen. The LSFR control TLV encoding 1700 also employs a TLV length field 1702 that includes data indicating the length of the LSFR control TLV. The TLV length field 1702 may be sixteen bits long and may extend from bit position sixteen to bit position thirty one.

The LSFR control TLV encoding 1700 also employs an operation (OP) field 1731, which may be three bits long and may extend from bit position zero to bit position two. The OP field 1731 can be employed to select and/or change the LSFR operating mode for nodes that are LSFR capable. The OP field 1731 can contain data to indicate that nodes should perform flooding reduction or may contain data to indicate that nodes should roll back to normal flooding without using a flooding topology. Hence, the LSFR control TLV encoding 1700 allows link state messages to contain an OP field set to switch to link state flooding reduction from full network flooding. For example, a user/system administrator may employ the OP field 1731 to turn LSFR on and/or off as desired.

The LSFR control TLV encoding 1700 also employs a mode (MOD) field 1732, which may be three bits long and may extend from bit position three to bit position five. LSFR may include three modes, including central mode, distributed mode, and static configuration mode, and the MOD field 1732 may be employed to signal a switch between modes. For example, the MOD field 1732 can be set to central mode, which directs the IGP network to select a leader and/or backup leader. The leader then computes the flooding topology, and floods the flooding topology to the other nodes. Every node receives and uses the flooding topology from the leader. The MOD field 1732 can also be set to distributed mode, which directs all the nodes in the IGP network to compute a flooding topology by employing a common algorithm as discussed above. The MOD field 1732 can also be set to static configuration mode, which directs the nodes in the IGP network to employ a configured flooding topology. Hence, the LSFR control TLV encoding 1700 allows link state messages to contain a MOD field 1732 set to indicate centralized link state flooding reduction, distributed link state flooding reduction, or statically configured link state flooding reduction.

The LSFR control TLV encoding 1700 also employs an algorithm field 1733, which may be eight bits long and may extend from bit position six to bit position thirteen. The algorithm field 1733 may contain data indicating an algorithm for computing a flooding topology (e.g., method 500, 600, and/or 700) that should be used by nodes in central and/or distributed mode. Hence, the LSFR control TLV encoding 1700 allows link state messages to contain an algorithm field 1733 set to indicate an algorithm to build the tree of links in the flooding topology.

The encoding 1700 may also include one or more optional sub-TLVs 1706 that contain additional information relevant to LSFR implementation.

Figure 18:
FIG. 18 is a schematic diagram of an example TLV encoding for integrating centralized LSFR with distributed LSFR.

FIG. 18 is a schematic diagram of an example TLV encoding 1800 for integrating centralized LSFR with distributed LSFR. Specifically, the TLV encoding 1800 may be used in conjunction with the LSFR control TLV encoding 1700, for example when the MOD field 1732 is set to central mode. The TLV encoding 1800 includes an information TLV type field 1801 and a TLV length field 1802 that are substantially similar to the information TLV type field 1701 and the TLV length field 1702, respectively. The TLV encoding 1800 also includes a priority field 1803, which may be eight bits long and may extend from bit position zero to bit position seven. The priority field 1803 may be employed to indicate a priority of a node originating a TLV to become a leader in central mode. The encoding 1800 may also include one or more optional sub-TLVs 1806 that contain additional information relevant to LSFR implementation. Such sub-TLVs 1806 may include a leader sub-TLV and/or a backup leader sub-TLV, which include a method/algorithm to select the leader and/or backup leader, respectively.

Figure 19:
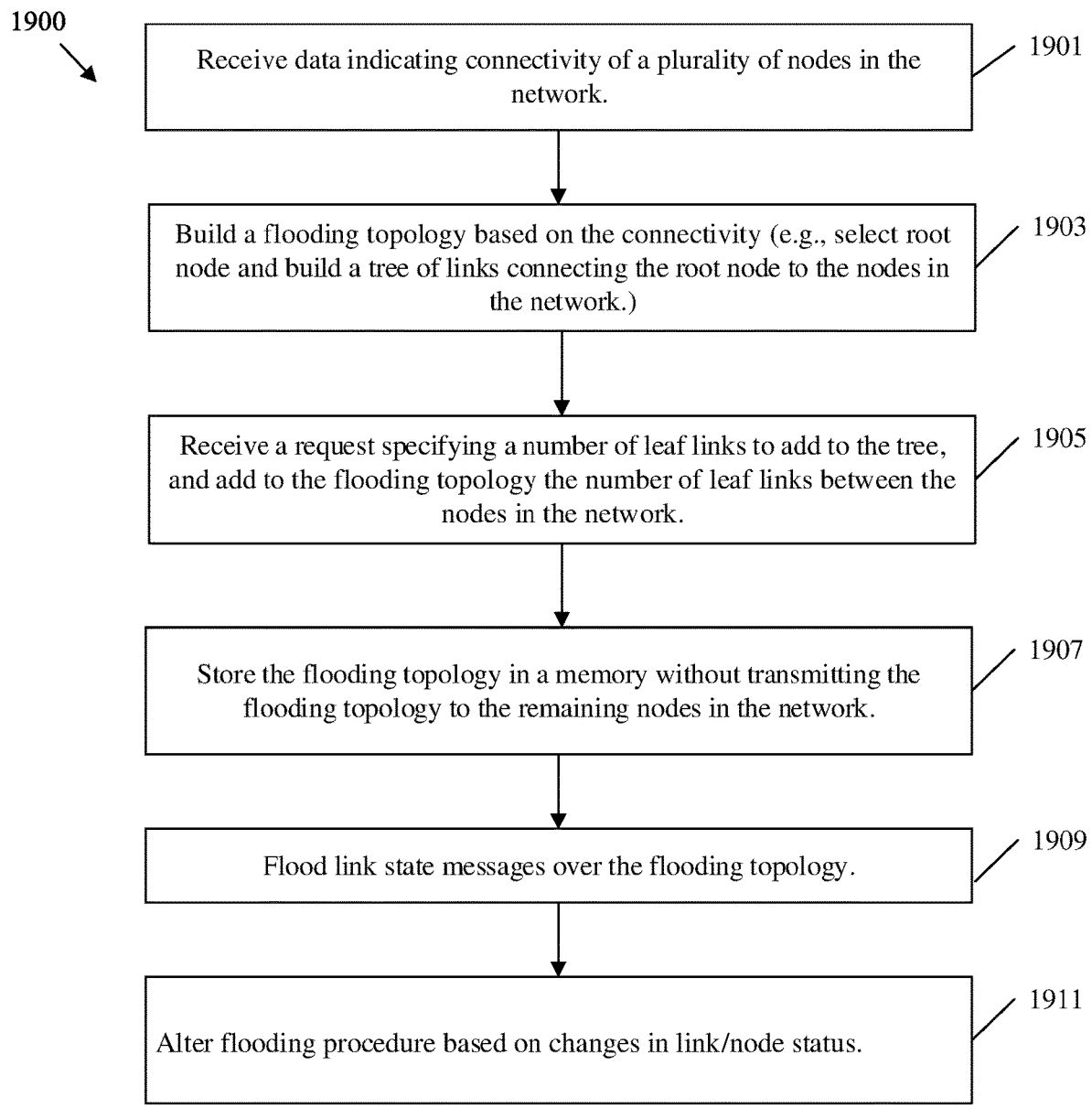
FIG. 19 is a flowchart of an example method of operating LSFR mechanisms in an IGP network.

FIG. 19 is a flowchart of an example method 1900 of operating LSFR mechanisms in an IGP network. For example, method 1900 may be employed by a node, such as nodes 111, 211, 212, 213, 311, 312, 400, 1311, 1312, and/or 1333, in an IGP network, such as IGP network 100, 200, 300, and/or 1300. Method 1900 may be employed in OSPF and/or IGP networks, and hence may be employed in conjunction with encoding 1400, 1500, and/or 1600. Method 1900 may be employed to build a flooding topology, for example by employing methods 500, 600, and/or 700. Method 1900 may also employ flooding mechanisms, such as flooding mechanisms 800, 900, 1000, 1100, and/or 1200. Method 1800 may also be initiated by receipt of an LSFR control TLV encoding 1700.

The method 1900 can be implemented on any node in an IGP network, which is denoted as a first node for purposes of clarity of discussion. At block 1901, data is received at the first node that indicates connectivity of a plurality of nodes in the network. Such data includes link state data, and can be received, for example, according to general flooding of link state messages, such as OSPF LSAs or IS-IS LSPs.

At block 1903, the first node (and all nodes in the network) build a flooding topology based on the connectivity. The flooding topology can be built by selecting one of the network nodes as a root node, and building a tree of flooding topology links connecting the root node to the other nodes in the network. For example, block 1903 may build a flooding topology by employing methods 500, 600, and/or 700. Building a flooding topology can occur periodically and/or upon the occurrence of a condition, such as a link/node malfunction, the malfunction of a critical interface, etc. As discussed above, the flooding topology can be built based on LSFR capability of the nodes, for example as advertised in link state messages employing an F flag. Further, the first node (and all nodes) can build the flooding topology according to an algorithm indicated in an LSFR control TLV encoding 1700 (e.g., in a link state message).

At optional block 1905, the first node may receive a request specifying a number of leaf links to add to the tree. The request may be a TLV included in a link state message, for example as initiated by a user/network administrator. If a request is received, the first node (and all nodes in the network) adds the number of leaf links to the flooding topology as specified in the request. Such leaf links are added between the nodes in the network, for example as discussed with respect to FIG. 3 above. For example, leaf links can be added to reduce the number of critical interfaces, can be added based on link ID/interface ID/node ID, etc. Prior to adding such leaf links, the tree of links in the flooding topology may contain a minimum number of links to connect all of the nodes in the network to the root node. The leaf links may increase reliability of the flooding topology at the expense of slightly increasing redundant link state message communication.

At block 1907, the first node stores the flooding topology in a memory without transmitting the flooding topology to the other nodes in the network. This approach ensures that the flooding topology is created at each node according to a preselected algorithm, which in turn reduces link state message flooding related to the flooding topology.

At block 1909, the first node floods link state messages over the flooding topology. Further, the first node does not flood link state messages outside of the flooding topology.

At optional block 1911, the first node may alter flooding procedure based on changes in link/node status. For example, the first node may employ flooding mechanisms 800, 900, 1000, 1100, and/or 1200 depending on the type of changes that occur in the network. As specific examples, the first node can receive a first link state message from a newly connected node, where the newly connected node is directly connected to the first node via a link. The first node can then add the newly connected node to the tree of links in the flooding topology until the flooding topology is recomputed. As another example, the first node can receive a second link state message across a link that is excluded from the flooding topology. The first node can then flood the second link state message outside of the flooding topology. As another example, the first node can receive a third link state message indicating a second node in the network is down. The first node can then flood the third link state message to links that are excluded from the flooding topology and connect between the first node and neighbors of the second node. As another example, the first node can receive a fourth link state message indicating a first link in the network is down. The first node can determine that the first link is in the flooding topology and the first link is connected to the first node. Based on the determination, the first node can send the fourth link state message to links that connect to neighbors which also connect nodes adjacent to the first link. As another example, the first node can determine critical interfaces in the network, where a critical interface is a link or node whose failure splits the flooding topology. The first node can discontinue use of the flooding topology when a critical interface fails.

Figure 20:
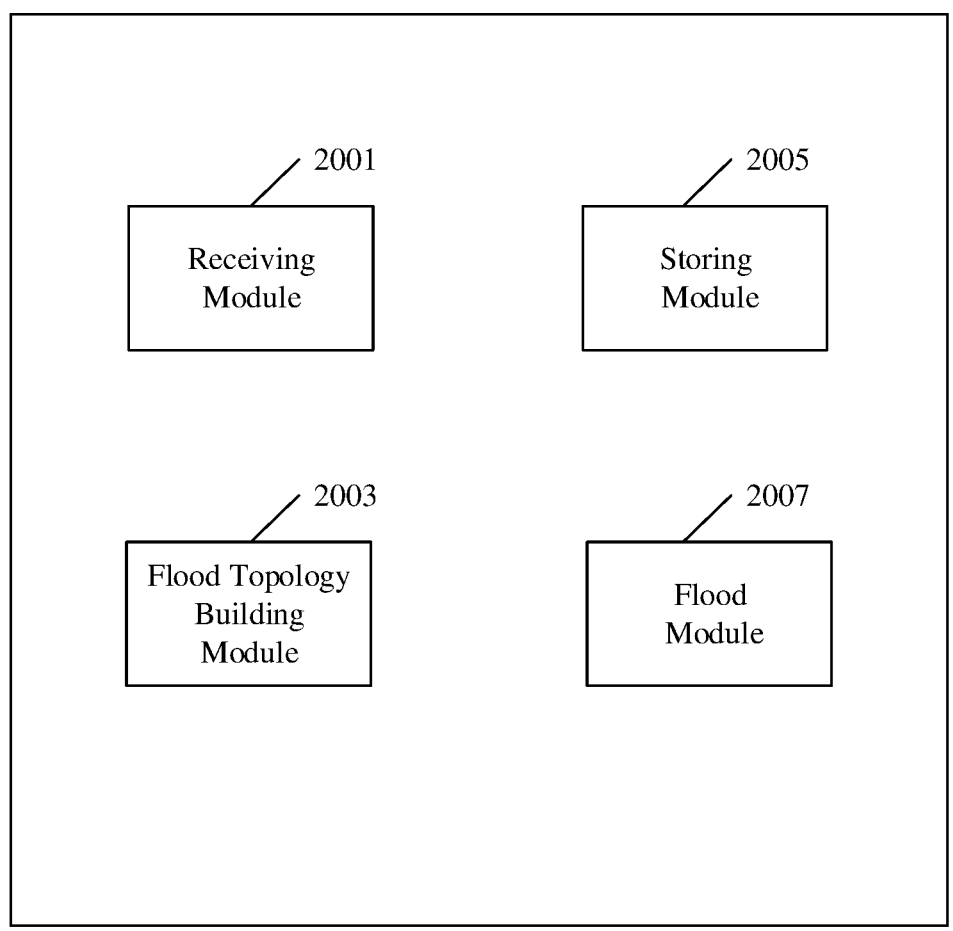
FIG. 20 is an embodiment of a device for operating LSFR mechanisms in an IGP network.

FIG. 20 is an embodiment of a device 2000 for operating LSFR mechanisms in an IGP network. For example, device 2000 may be employed to implement method 1900. Further, device 2000 may be employed as a node, such as nodes 111, 211, 212, 213, 311, 312, 400, 1311, 1312, and/or 1333, in an IGP network, such as IGP network 100, 200, 300, and/or 1300. Device 2000 may be employed in OSPF and/or IGP networks, and hence may be employed in conjunction with encoding 1400, 1500, and/or 1600. Device 2000 may be employed to build a flooding topology, for example by employing methods 500, 600, and/or 700. Device 2000 may also employ flooding mechanisms, such as flooding mechanisms 800, 900, 1000, 1100, and/or 1200. Device 2000 may also be controlled by receipt of an LSFR control TLV encoding 1700.

The device 2000 includes a receiving module 2001, which is a means for receiving data indicating connectivity of a plurality of nodes in the network including the first node. The device 2000 includes a flood topology building module 2003, which is a means for building a flooding topology based on the connectivity by selecting one of the nodes as a root node, and building a tree of links connecting the root node to the nodes in the network. The device 2000 includes a storing module 2005, which is a means for storing the flooding topology without transmitting the flooding topology to the plurality nodes in the network. The device 2000 also includes a flooding module 2007, which is a means for flooding link state messages over the flooding topology.

In one embodiment, a first node in a network includes receiving means for receiving data indicating connectivity of a plurality of nodes in the network including the first node. The first node further includes building means for building, by a processor means of the first node, a flooding topology based on the connectivity by selecting one of the nodes as a root node, by building a tree of links connecting the root node to the nodes in the network, by storing the flooding topology in a memory without transmitting the flooding topology to the plurality of nodes in the network and by flooding link state messages over the flooding topology.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented in a first node in a network, the method comprising:
   receiving, at a receiver of the first node, data indicating connectivity of a plurality of nodes in the network including the first node;
   building, by a processor of the first node, a flooding topology based on the connectivity by:
      selecting one of the plurality of nodes as a root node, and
      building a tree of links connecting the root node to other nodes in the network according to an algorithm, wherein the algorithm is contained in an algorithm field of a received link state message;
   storing the flooding topology in a memory; and
   flooding, by a transmitter of the first node, link state messages over the flooding topology.

2. The method of claim 1, further comprising:
   receiving, at the receiver, a request specifying a number of leaf links to add to the tree; and
   adding to the flooding topology, by the processor, the number of leaf links between the plurality of nodes in the network.

3. The method of claim 1, wherein, prior to adding leaf links, the tree of links in the flooding topology contains a minimum number of links to connect all of the plurality of nodes in the network to the root node.

4. The method of claim 1, further comprising:
   establishing, by the processor, an adjacency with a newly connected node, wherein the newly connected node is directly connected to the first node via a link; and
   adding, by the processor, the newly connected node to the tree of links in the flooding topology until the flooding topology is recomputed.

5. The method of claim 1, further comprising:
   receiving, at the receiver, a first link state message across a link that is excluded from the flooding topology; and
   flooding, by the transmitter, the first link state message across links on the flooding topology.

6. The method of claim 1, further comprising:
   receiving, at the receiver, a second link state message indicating a second node in the network is down; and
   flooding, by the transmitter, the second link state message to links that connect between the first node and neighbors of the second node.

7. The method of claim 1, further comprising:
   receiving, at the receiver, a third link state message indicating a first link in the network is down;
   determining that the first link is a critical element; and
   based on the determination, sending the third link state message to links that connect to neighbors which also connect nodes adjacent to a node attached to the first link.

8. The method of claim 1, further comprising:
   determining, by the processor, critical elements, wherein a critical element is a link or node whose failure splits the flooding topology; and
   discontinue use of the flooding topology when a critical interface fails.

9. The method of claim 1, wherein the link state messages are Open Shortest Path First (OSPF) Link State Advertisements (LSAs), or Intermediate System to Intermediate System (IS-IS) Link State Protocol data units (LSPs).

10. The method of claim 1, wherein the link state messages contain at least one of the following:
   flooding reduction (F) flags set to indicate the plurality of nodes in the network that support link state flooding reduction via the flooding topology;
   a mode field set to indicate centralized link state flooding reduction, distributed link state flooding reduction, or statically configured link state flooding reduction;
   an algorithm field set to indicate an algorithm to build the tree of links in the flooding topology; or
   an operation (OP) field set to switch to link state flooding reduction from full network flooding.

11. A first node in a network, the first node comprising:
a receiver configured to receive data indicating connectivity of a plurality of nodes in the network including the first node;
a processor coupled to the receiver, the processor configured to:
build a flooding topology based on the connectivity by:
selecting one of the plurality of nodes as a root node, and
building a tree of links connecting the root node to other nodes in the network according to an algorithm, wherein the algorithm is contained in an algorithm field of a received link state message;
a memory coupled to the processor, the memory configured to store the flooding topology; and
a transmitter coupled to the processor, the transmitter configured to flood link state messages over the flooding topology.

12. The first node of claim 11, wherein the receiver is further configured to receive a request specifying a number of leaf links to add to the tree, and wherein the processor is further configured to add to the flooding topology the number of leaf links between the plurality of nodes in the network.

13. The first node of claim 11, wherein, prior to adding leaf links, the tree of links in the flooding topology contains a minimum number of links to connect all of the plurality of nodes in the network to the root node.

14. The first node of claim 11, wherein the processor is further configured to establish an adjacency with a newly connected node, wherein the newly connected node is directly connected to the first node via a link, and wherein the processor is further configured to add the newly connected node to the tree of links in the flooding topology until the flooding topology is recomputed.

15. The first node of claim 11, wherein the receiver is further configured to receive a first link state message across a link that is excluded from the flooding topology, and wherein the transmitter is further configured to flood the first link state message across links on the flooding topology.

16. The first node of claim 11, wherein the receiver is further configured to receive a second link state message indicating a second node in the network is down, and wherein the transmitter is further configured to flood the second link state message to links that connect between the first node and neighbors of the second node.

17. The first node of claim 11, wherein the receiver is further configured to receive a third link state message indicating a first link in the network is down, wherein the processor is further configured to determine that the first link is a critical element, and wherein the transmitter is further configured to, based on the determination, send the third link state message to links that connect to neighbors which also connect to neighbor nodes adjacent to a node attached to the first link.

18. The first node of claim 11, wherein the processor is further configured to:
determine critical elements, wherein a critical element is a link or node whose failure splits the flooding topology; and
discontinue use of the flooding topology when a critical element fails.

19. The first node of claim 11, wherein the link state messages are Open Shortest Path First (OSPF) Link State Advertisements (LSAs), or Intermediate System to Intermediate System (IS-IS) Link State Protocol data units (LSPs).

20. The first node of claim 11, wherein the link state messages contain at least one of the following:
flooding reduction (F) flags set to indicate the plurality of nodes in the network that support link state flooding reduction via the flooding topology;
a mode field set to indicate centralized link state flooding reduction, distributed link state flooding reduction, or statically configured link state flooding reduction;
an algorithm field set to indicate an algorithm to build the tree of links in the flooding topology; or
an operation (OP) field set to switch to link state flooding reduction from full network flooding.

21. A non-transitory computer readable medium comprising a computer program product for use by a first node in a network, the computer program product comprising computer executable instructions stored on the non-transitory computer readable medium such that when executed by a processor cause the first node to:
receive data indicating connectivity of a plurality of nodes in the network including the first node;
build a flooding topology based on the connectivity by selecting one of the plurality of nodes as a root node, and building a tree of links connecting the root node to other nodes in the network according to an algorithm, wherein the algorithm is contained in an algorithm field of a received link state message;
store the flooding topology; and
flood link state messages over the flooding topology.

* * * * *